(12) United States Patent
Horiyama et al.

(10) Patent No.: US 7,616,531 B2
(45) Date of Patent: Nov. 10, 2009

(54) INTEGRATED OPTICAL UNIT, ADJUSTING METHOD THEREFOR, AND OPTICAL PICKUP

(75) Inventors: Makoto Horiyama, Nara (JP); Masaru Ogawa, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 526 days.

(21) Appl. No.: 11/509,193

(22) Filed: Aug. 23, 2006

(65) Prior Publication Data

US 2007/0081440 A1 Apr. 12, 2007

(30) Foreign Application Priority Data

Aug. 26, 2005 (JP) .............................. 2005-246829

(51) Int. Cl.
*G11B 7/00* (2006.01)
(52) U.S. Cl. ............ 369/44.12; 369/44.28; 369/112.03; 369/112.27
(58) Field of Classification Search ........................ None
See application file for complete search history.

(56) References Cited

U.S. PATENT DOCUMENTS

| 5,490,128 A | 2/1996 | Ogata | |
|---|---|---|---|
| 2004/0026756 A1 | 2/2004 | Yoshida et al. | |
| 2004/0156299 A1* | 8/2004 | Sakai et al. | 369/112.1 |

FOREIGN PATENT DOCUMENTS

| JP | 04-102239 | 4/1992 |
|---|---|---|
| JP | 07-129966 | 5/1995 |
| JP | 11-203707 | 7/1999 |
| JP | 2000-011443 | 1/2000 |
| JP | 2001-167464 | 6/2001 |
| JP | 2001-250257 | 9/2001 |
| JP | 2001-273666 | 10/2001 |
| JP | 2002-025073 | 1/2002 |
| JP | 2003-101063 | 4/2003 |
| JP | 3545307 | 4/2004 |
| JP | 2004-200583 | 7/2004 |
| JP | 2004-253094 | 9/2004 |

OTHER PUBLICATIONS

Y. Kanazawa et al., "Spherical Aberration Error Signal Detection for Blu-Ray Disc Optical Pickups (I)," issued Mar. 29, 2005, presented Apr. 1, 2005 in proceedings of 52nd Japan Applied Physics Conference.

(Continued)

*Primary Examiner*—Muhammad N. Edun
(74) *Attorney, Agent, or Firm*—David G. Conlin; Steven M. Jensen; Edwards Angell Palmer & Dodge LLP

(57) ABSTRACT

In an integrated optical unit of the present invention, a photo detector (12) and a holding member (17) that sustains a semiconductor laser (11) are provided on a polarizing beam splitter (14). This makes it possible to reduce a deviation from a designed value due to tolerance, and adjust a relative positional relationship between the semiconductor laser (11) and the photo detector (12). Therefore, returned light from an optical disk (4) is accurately adjusted with respect to a division line of a photo-detecting device (13). As a result, stable servo-control is realized, and an information signal with fine quality is obtained.

25 Claims, 9 Drawing Sheets

OTHER PUBLICATIONS

N. Ogata et al., "Spherical Aberration Error Signal Detection for Blu-Ray Disc Optical Pickups (II)," issued Mar. 29, 2005, presented on Apr. 1, 2005 in proceedings of 52nd Japan Applied Physics Conference.

N. Ogata et al., "Spherical Aberration Error Detection for Blu-Ray Disc Optical Pickups," presented May 19, 2005 in First Optical-Disc Meeting 2005.

Y. Kanazawa et al., "Integrated Optical Unit for Blu-Ray Disc," presented on Nov. 23, 2005 in Optics Japan 2005.

M. Horiyama et al., "Optical Pickup Using Integrated Optical Unit for Blu-Ray Disc," presented on Apr. 24, 2006 in 2006 Optical Data Storage Topical Meeting.

M. Horiyama et al., "Optical Pickup Head Using Integrated Optical Unit for Blu-Ray Disc," issued Sep. 10, 2006 in 2006 Micro Optics Conference.

Y. Kanazawa et al., "Integrated Optical Unit for Blu-Ray Disc," IEICE, vol. 106, No. 248, CPM2006-85, pp. 37-39 (Sep. 2006).

M. Horiyama et al., "Optical Pickup Using Integrated Optical Unit for Blu-Ray Disc," SPIE, vol. 6282, 62820A (2006).

* cited by examiner

INTEGRATED OPTICAL UNIT, ADJUSTING METHOD THEREFOR, AND OPTICAL PICKUP

This Nonprovisional application claims priority under 35 U.S.C. § 119(a) on Patent Application No. 246829/2005 filed in Japan on Aug. 26, 2005, the entire contents of which are hereby incorporated by reference.

FIELD OF THE INVENTION

The present invention relates to an optical pickup used in recording information to an optical storage medium, such as an optical disk, and reproducing information stored in the optical storage medium.

BACKGROUND OF THE INVENTION

In recent years, there have been strong demands for an optical storage medium, such as an optical disk, with higher density and greater capacity in information storage, to allow storing moving-images with high image quality. Furthermore, there also have been strong demands for an optical pickup that is smaller in size and lighter in weight, to allow the optical disk to be used on-the-move.

In response to the demands for smaller size and lighter weight, a variety of integrated pickup apparatuses have been suggested.

For example, Patent Document 1 (Japanese Unexamined Patent Publication No. 11-203707 (published on Jul. 30, 1999)) suggests: a semiconductor integrated light emitting apparatus using a photo-detecting device and a beam splitter, both of which are formed on an integrated circuit substrate; and an optical pickup using the light emitting apparatus. The following describes the semiconductor integrated light emitting apparatus 101 and the optical pickup 120, with reference to FIG. 13.

The optical pickup 120 includes a semiconductor integrated light emitting apparatus 101, a grating 106, a hologram 107, a reflecting mirror 110, and an objective lens 111. The semiconductor integrated light emitting apparatus 101 includes an integrated circuit substrate 103, a semiconductor light emitter 102, photo-detecting device 104, a beam splitter 105, and a light absorbing film 108.

The semiconductor light emitter 102, which is included in the semiconductor integrated light emitting apparatus 101, emits laser light, and the beam splitter 105 transmits a constant proportion of the laser light. A part of the laser light emitted from the light emitter 102 does not transmit through the beam splitter 105 but is reflected toward an opposite side to a side on which the photo-detecting device 104 is formed. The laser light thus reflected is absorbed by the light absorbing film 108, which is formed on a side surface of the beam splitter 105. After having transmitted through the beam splitter 105, the laser light is diffracted by the grating 106. The laser light thus diffracted is bent toward the objective lens 111 by the reflecting mirror 110, and is converted to an optical disk 112 by the objective lens 111. Thereafter, the laser light is reflected by the optical disk 112, and then is reflected by the reflecting mirror 110, whereby the laser light is bent toward the light emitting apparatus 101. Then, the laser light enters the hologram 107, is diffracted, and then enters the beam splitter 105. The beam splitter 105 causes an optical path of the laser light to change so as to cause the laser light to enter the photo-detecting device 104, which is formed on the integrated circuit substrate 103.

The photo-detecting device 104 detects a spot size of the laser light, a change in location of the laser light, and the like. As such, a tracking error signal, a focus error signal, and an information signal that is stored in the optical disk 112 are reproduced. These signals are taken out by using commonly-known methods, respectively.

Patent Document 2 (Japanese Patent Publication No. 3545307 (granted on Apr. 16, 2004)) teaches another conventional method. Specifically, the document suggests: an integrated optical unit employing a hologram element and a beam splitter; and an optical pickup employing the integrated optical unit.

FIG. 14 is a diagram illustrating in detail a structure of an integrated optical unit 201, which is a conventional unit described in Patent Document 2.

The integrated optical unit 201 includes: a semiconductor laser (light source) 205; a quarter-wave plate 208; a glass substrate 232 on which a diffraction grating 206 for three beams and a hologram element 209 are formed; a polarizing beam splitter 207, which is a composite prism; a photo-detecting device 210, which is a photo detector; and a package 231. The package 231 includes a stem 231a. The semiconductor laser 205 and the photo-detecting device 210 are mounted on the stem 231a.

The semiconductor laser 205 emits a light beam 220 (optical axis center 222). The diffraction grating 206 divides the light beam 220 into a main beam (zero-order diffracted light) and two sub-beams (±first-order diffracted light). The light beam 220 thus divided passes through a surface (PBS surface) 207a of the polarizing beam splitter (PBS) 207, and transmits through the quarter-wave plate 208 toward an optical disk (not illustrated). To avoid complication, illustration of the sub-beams (±first-order diffracted light) is omitted in the figure.

After entering the optical disk, the light beam 220 is reflected by the optical disk. A returned light beam 221 (optical axis centers 223, 224), which is a light beam 220 that is reflected by the optical disk, transmits through the quarter-wave plate 208, is reflected by the PBS surface 207a and a surface 207b of a reflecting mirror, and then enters the hologram element 209. After having entered the hologram element 209, the returned light beam 221 is diffracted so as to be divided into positive first-order diffracted light (optical axis center 225a) and negative first-order diffracted light (optical axis center 225b), and then enters the photo-detecting device 210. To avoid complication, only a light beam of an optical axis center of the returned light beam 221 is illustrated in the figure.

The semiconductor laser 205 emits light (P-polarized light) that is linearly polarized in direction X. After having transmitted through the PBS surface 207a, the light is circularly polarized in the quarter-wave plate 208 and then enters the optical disk. Return-light from the optical disk re-enters the quarter-wave plate 208 so as to be converted into light (S-polarized light) that is linearly polarized in direction Y. Then, the light is reflected by the PBS surface 207a.

By this way, light emitted from the semiconductor laser 205 is directed to the optical disk almost entirely, both the main-beam and the sub-beams. Furthermore, the returned light beam 221 is directed to the photo-detecting device 210 almost entirely. Therefore, light utilization efficiency is high.

In the semiconductor integrated light emitting apparatus 101 of Patent Document 1, the semiconductor light emitter 102, the photo-detecting device 104, and the beam splitter 105 are integrated on the integrated circuit substrate 103. To detect the tracking error signal, the focus error signal, and the information signal, it is necessary to cause laser light to be incident on a predetermined spot on the photo-detecting device 104, which is divided. Therefore, relative positions of the semiconductor light emitter 102 and the photo-detecting device 104 need to be adjusted highly accurately. In other words, relative positions of the semiconductor light emitter 102 and the photo-detecting device 104 need to be adjusted highly accurately because accuracy of an information signal thus obtained and the like is affected by an incident location where laser light is incident on the photo-detecting device 104.

However, the positional adjustment to cause the laser light to be incident on the photo-detecting device 104 is decided by (i) accuracy in bonding (accuracy in electrically coupling and fixing) the semiconductor light emitter 102 to the integrated circuit substrate 103 and (ii) accuracy in mounting the beam splitter 105, because the photo-detecting device 104 is formed on the integrated circuit substrate 103. Thus, the adjustment is less likely to have been accurately performed. Especially a beam-incident location in direction X on the photo-detecting device 104 is affected by fluctuation in height (direction Z shown in FIG. 13) of a light-emitting point of the semiconductor light emitter 102. Further, a beam-incident location in direction Y on the photo-detecting device 104 is affected by fluctuation in position, in direction Y, where the semiconductor light emitter 102 is bonded (direction Y shown in FIG. 13). The two directions are affected by accuracy (fluctuation) in bonding of the semiconductor light emitter 102. Thus, accurate adjustment has been difficult.

Furthermore, even in the case where the semiconductor light emitter 102 is first bonded to the integrated circuit substrate 103, and then emits laser light to adjust the beam splitter 105, because the semiconductor light emitter 102 is not sealed in a package, there is a high possibility of deterioration in characteristics of the semiconductor light emitter 102 due to external force accidentally applied during the adjustment.

Further, in order to seal the semiconductor light emitter 102 and take out an output from the photo-detecting device 104, the integrated circuit substrate 103 needs to be entirely included in a package. As an optical system or the number of divisions of the photo-detecting device changes due to reduction in size and change in design, it becomes necessary to have specially-designed packages. This causes a problem of increase in costs.

In the integrated optical unit 201 of Patent Document 2, the semiconductor laser 205 and the photo-detecting device 210 (photo detector) are combined. If (i) the semiconductor laser 205 or the photo-detecting device 210 is inaccurately mounted, (ii) the package 231, the stem 231a, and the polarizing beam splitter 207 are inaccurately manufactured, or (iii) the hologram element 209, the semiconductor laser 205, the photo-detecting device 210, and the like are out of a tolerance of respective design values, then the semiconductor laser 205 and the photo-detecting device 210 are deviated from their relative positions. This causes problems that a beam converted to the photo-detecting device 210 is deviated from a division line, and that the beam is deviated from a converged state and thus expands. Concrete examples of the tolerance in relation to the conventional techniques include: a tolerance in thickness (direction Z shown in FIG. 14) of the polarizing beam splitter 207; and a tolerance in thickness (direction Z shown in FIG. 14) of the stem 231a on which the photo-detecting device 210 is mounted.

SUMMARY OF THE INVENTION

In view of the conventional problems described above, the present invention has as an object to realize (i) an integrated optical unit that allows easy adjustment of relative positions of a light source and a photo detector, and (ii) an optical pickup using the integrated optical unit.

In order to solve the above problems, an integrated optical unit of the present invention is adapted so that the integrated optical unit includes: a light source that emits light with respect to an optical storage medium; a diffraction element that divides returned light returning from the optical storage medium; light splitting means for directing the returned light in a direction that is different from a direction in which the light source is provided; a photo detector that detects the returned light; and a holding member in which the light source and the light splitting means are provided, the photo detector being fixed to a location on the light splitting means from which location the returned light outgoes.

In the above structure, there is provided the holding member on which the light source and the light splitting means are provided, and the photo detector is fixed to a location on the light splitting means from which location the returned light outgoes. With this structure, it becomes possible to adjust the positions of the photo detector and the light source by relatively moving the light source with respect to the photo detector fixed to the light splitting means. Accordingly, it is sufficient to move one of the light source and the photo detector. This allows the positions of the light source and the photo detector to be adjusted accurately. As such, the returned light from the optical storage medium is accurately adjusted with respect to the photo detector, so that signals are detected stably. Note that the "returned light" indicates light that is emitted from the light source and then reflected by the optical storage medium (optical disk).

Further, in the above structure, the photo detector is fixed directly to the light splitting means. This eliminates influence of tolerance originated from a stem, which influence is generated in the case of the conventional integrated optical units in which the photo detector is fixed to the stem used as a supporting base to which a photo detector and the like is to be fixed. In other words, an advantage is produced that influence of assembly tolerance is reduced. Accordingly, stable focus servo is realized. In other words, servo-control is performed stably.

Further, generally, if there arises a deviation from a designed value due to tolerance and the like, the focus offset (focus-deviation amount) needs to be adjusted. This adjustment is performed by rotating the hologram element and the like. If the deviation-amount is great, the number of rotations increases. This causes the integrated optical unit to become larger. With the above structure, however, influence of tolerance is reduced. As such, the deviation from the design value is reduced, so that the number of rotations of the hologram element for adjusting focus offset is restrained. Therefore, a thinner integrated optical unit is realized.

It is preferable in the integrated optical unit of the present invention that the light source include: a light emitting device; and a first package that accommodates the light emitting device.

In the above structure, the light source includes: the light emitting device; and the first package that accommodates the light emitting device. With this structure, accidentally-applied external force is prevented from affecting the light source, so that deterioration in characteristics of the light emitting device and the like is prevented. This enables the light emitting device to stably emit a light beam. Further, employment of a general-purpose package produces advantages that lower costs are achieved, and that it becomes easy to follow changes in relation to the light source. Further, employment of a semiconductor laser that is a light source accommodated in a general-purpose package having a uniform shape of industrial standards facilitates following changes in the semiconductor laser, which changes are made due to selections/changes in specifications or manufacturers. Furthermore, the employment of such semiconductor laser allows an initial development period and an initial development costs to be restrained, so that reduction in costs is attempted.

It is preferable in the integrated optical unit of the present invention that the light source include: a light emitting device; a first package that accommodates the light emitting device; and an adjusting member that is fixed to the first package.

In the above structure, the adjusting member is fixed to the first package of the light source. Therefore, even if the first package is too small to be held, it is possible to handle the first package by handling the adjusting member. This facilitates positional adjustment of the light source.

Further, it is preferable in the integrated optical unit of the present invention that the holding member have a first depressed portion that allows the light source to be inserted therein.

In the above structure, the holding member has the first depressed portion that allows the light source to be inserted therein. This enables protecting the light source by inserting the light source into the first depressed portion of the holding member. Thus, the position of the light source is prevented from deviating due to accidentally-applied external force.

It is preferable in the integrated optical unit of the present invention that there is a clearance between an inner surface of the first depressed portion and an outer surface of the light source inserted in the first depressed portion.

In the above structure, there is a space (clearance) between the inner surface of the first depressed portion and the outer surface of the light source inserted in the first depressed portion, and the space (clearance) surrounds the outer surface of the light source. This allows the light source to move freely in the depressed portion while inserted in the first depressed portion. This facilitates adjusting the position of the light source in the first depressed portion. Note that the "inner surface" indicates a surface that becomes opposite to the outer surface of the light source when the light source is inserted in the depressed portion. Further, the "outer surface" indicates a surface that becomes opposite to the inner surface of the depressed portion when the light source is inserted in the depressed portion.

Further, it is preferable that the inner surface of the depressed portion and the outer surface of the light source be similar in shape, for example circular shapes with different diameters. In the case where the returned light is incident on a predetermined location on the photo-detector, that is, the case where there is no deviation, if the inner surface of the depressed portion and the outer surface of the light source are provided such that their centers coincide with each other, a space of equal width is formed in between the inner surface of the depressed portion and the outer surface of the light source. This facilitates the positional adjustment for canceling deviations.

Further, the light source may be brought into contact with the inner surface of the first depressed portion and moved. For example, the light source may be brought into contact with the inner surface of the first depressed portion and moved, which inner surface is orthogonal to an optical axis of a light beam emitted by the light source. This makes it unnecessary to adjust in an optical-axis direction of the light beam, and allows the adjustment to be conducted in the surface being in contact, compared to the case in which the light source is not in contact with the first depressed portion. This further facilitates adjusting the positions.

It is preferable in the integrated optical unit of the present invention that the holding member have a second depressed portion that allows the photo detector to be inserted therein.

In the above structure, it is possible to insert the photo detector in the second depressed portion of the holding section. This allows the photo detector to be protected from accidentally-applied external force. In other words, this structure produces advantages that the position of the photo detector fixed to the light splitting means is prevented from deviating due to accidentally-applied external force, and that the photo detector is prevented from being damaged. For example in the case where a terminal for receiving and supplying a signal and a flexible substrate, which is coupled to the terminal by soldering, are provided on a bottom section of the photo detector, it is possible to electrically and mechanically protect them. Therefore, a coupling section of the terminal, the flexible substrate and the like are prevented from electrically or mechanically destroyed due to accidentally-applied external force, electrical contact, or the like.

Further, the second depressed portion includes a protruded portion and a bottom section. This allows the light splitting means to be sustained by the protruded portion, and therefore produces an advantage that the holding member is more stably placed on the light splitting means. Accordingly, it becomes possible to stably perform the positional adjustment of the returned light. Further, as described above, the photo detector is protected by the second depressed portion of the holding member, that is, the protruded portion and the bottom section.

It is preferable in the integrated optical unit of the present invention that the photo detector include: a photo-detecting device; and a second package that accommodates the photo-detecting device.

In the above structure, the photo-detecting device is accommodated in the second package of the photo detector. This enables the second package to protect the photo-detecting device from accidentally-applied external force. Thus, reliability of the apparatus improves. Further, employment of a general-purpose package facilitates following changes in the light source. Further, employment of a semiconductor laser that is a light source accommodated in a general-purpose package having a uniform shape of industrial standards facilitates following changes in the semiconductor laser, which changes are made due to selections/changes in specifications or manufacturers. Furthermore, the employment of such semiconductor laser allows an initial development period and an initial development costs to be restrained, so that reduction in costs is attempted.

It is preferable in the integrated optical unit of the present invention that the second package be directly fixed to the light splitting means.

In the above structure, the second package is fixed directly to the light splitting means. This produces an advantage that factors of generating the tolerance are reduced, compared to the conventional techniques. Further, the photo detector that is packaged is mounted on the integrated optical unit. This produces an advantage that it becomes easier to mount than in the conventional techniques.

It is preferable in the integrated optical unit of the present invention that an optical medium be present between the light splitting means and the photo-detecting device. Furthermore, it is preferable that the optical medium be air.

In the above structure, an optical medium, that is, the air is present between the light splitting means and the photo-detecting device. This assures that a light beam having outgone from the light splitting means reaches the photo-detecting device without being diffracted. Further, the structure is not affected by tolerance, compared to the conventional structures. Therefore, an accurate information signal is supplied to the photo-detecting device.

It is preferable in the integrated optical unit of the present invention that the photo detector include: a photo-detecting device; a second package that accommodates the photo-detecting device; and a light transmitting member that causes the returned light to transmit.

In the above structure, the photo detector includes: the photo-detecting device; the second package that accommodates the photo-detecting device; and the light transmitting member that causes the returned light to transmit. This enables sealing the second package in which the photo-detecting device is accommodated. Further, the photo-detecting device is not exposed to the outside. This reduces the possibilities that, while the photo detector is fixed to the light splitting means, the position of the photo-detecting device is deviated in the second package, and the photo-detecting device is damaged.

It is preferable in the integrated optical unit of the present invention that the diffraction element be a polarized-light diffracting element.

In the above structure, the diffraction element is a polarized-light diffraction element. This makes it possible to (i) diffract P-polarized light of linearly-polarized light of a light beam and transmit S-polarized light of the linearly-polarized light, and (ii) diffract S-polarized light of the linearly-polarized light and transmit P-polarized light of the linearly-polarized light. Accordingly, the integrated optical unit of the present invention produces an advantage that the P-polarized light and the S-polarized light of the light beam are diffracted respectively. For example, it is possible to diffract the light beam (P-polarized light) and diffract the returned light (S-polarized light).

It is preferable in the integrated optical unit of the present invention that the light splitting means include two reflective surfaces that are parallel to each other.

In the above structure, the light splitting means includes two reflective surfaces, and the reflective surfaces are parallel to each other. Therefore, when entering the light splitting means, the returned light from the optical storage medium is reflected twice by the reflective surfaces that are parallel to each other. This makes it possible to equalize (i) an angle of incident light with respect to the optical axis and (ii) an angle of outgoing light with respect to the optical axis in the case where the returned light passes through the light splitting means. In other words, the surface via which the returned light enters the light splitting means and the surface via which the returned light outgoes from the light splitting means become opposite to each other. Further, it also becomes possible to separate the optical axis of the incident light and the optical axis of the outgoing fight. In other words, it becomes possible to separate an incident light beam coming from the light source and the returned light coming from the optical storage medium. For example, the light splitting means uses a parallelogram-shape glass to separate outgoing light from the semiconductor laser and returning light from the optical storage medium, by utilizing reflection at the two surfaces that are parallel and in parallelogram-shape. Therefore, it becomes possible to separate the optical path from the semiconductor laser to the PBS surface (reflective surface), which is the light-dividing surface, and the optical path from the PBS surfaces to the photo detector. This allows a distance to be reserved between the light source and the photo detector.

Therefore, it becomes easy to place the light source and the photo detector in the integrated optical unit, even if they are large in dimensions.

In order to solve the above problems, the optical pickup of the present invention is adapted so that the optical pickup includes at least: the integrated optical unit; and light converging means for converging light to the optical storage medium.

In the above structure, the optical pickup includes at least: the integrated optical unit; and the light converging means for converging light to the optical storage medium. This allows a light beam emitted by the integrated optical unit to be converged to the optical storage medium.

It is preferable in the optical pickup of the present invention that the light converging means include at least a collimator lens.

In the above structure, the light converging means includes at least a collimator lens. This allows a light beam from the integrated optical unit to be converted into parallel light. This produces an advantage that it becomes easier to converge light to the optical storage medium. Further, employment of the collimator lens that is immovable with respect to the optical pickup realizes that the optical axis is adjusted highly accurately on the basis of the light source and the collimator lens, and that the diffraction element and the like are placed highly accurately on the basis of the light source and the collimator lens.

In order to solve the above problems, the adjusting method for the integrated optical unit according to the present invention is adapted so that the adjusting method includes the step of adjusting a location on the photo detector on which location the returned light is incident, by, while one of the light source and the photo detector is being fixed to the light dividing means, relatively moving, with respect to the one of the light source and the photo detector, the other one of the light source and the photo detector.

In the above arrangement, a location on the photo detector is adjusted, on which location the returned light is incident, by, while one of the light source and the photo detector is being fixed to the light dividing means, relatively moving, with respect to the one of the light source and the photo detector, the other one of the light source and the photo detector. This makes it easier to adjust an incident location on the photo detector, on which incident location the returned light is incident, than in the case where both of the light source and the photo detector are moved with respect to the light splitting means. Thus, it becomes possible to accurately adjust the location on the photo detector on which location the returned light is incident.

In order to solve the above problems, the adjusting method for the integrated optical unit according to the present invention is adapted so that the adjusting method includes the step of adjusting a location on the photo detector on which. location the returned light is incident, by relatively moving the light source and the holding member while (i) the photo detector is being fixed to the light splitting means and (ii) the light splitting means is being fixed to the holding member.

In the above arrangement, a location on the photo detector is adjusted, on which location the returned light is incident, by relatively moving the light source and the holding member while (i) the photo detector is being fixed to the light splitting means and (ii) the light splitting means is being fixed to the holding member. This allows the adjustment to be performed after the photo detector and the holding member are fixed to the light splitting means. Accordingly, the arrangement produces an advantage that lower accuracy is allowable in fixing the photo detector and the holding member to the light splitting means, that is, lower assembly accuracy is allowable, compared to conventional techniques.

It is preferable that the adjusting method for the integrated optical unit according to the present invention include the step of adjusting, in accordance with an output signal supplied by the photo detector, a location on the photo detector on which location the returned light is incident.

In the above arrangement, the location on the photo detector, on which location the returned light is incident, is adjusted in accordance with the output signal supplied by the photo detector. This facilitates adjusting the positions of the light source and the photo detector, and consequently reduces generation of focus offset.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

The following describes an embodiment of the present invention, with reference to FIGS. 1 to 10.

Figure 1:
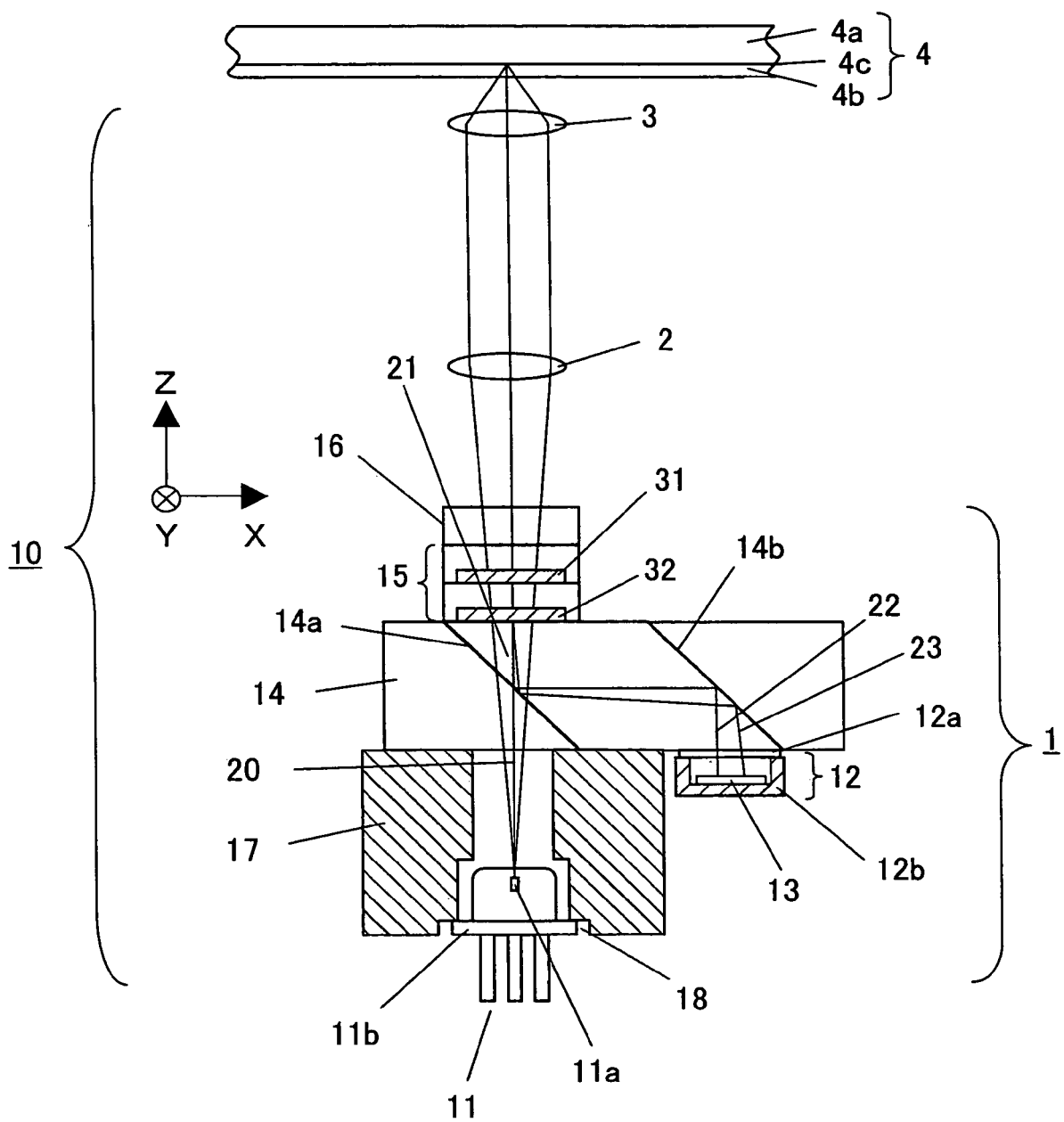
FIG. 1 is a diagram illustrating a structure of an optical pickup according to an embodiment of the present invention.

FIG. 1 shows a structure of an optical pickup 10 employing an integrated optical unit 1 of the present embodiment. As shown in FIG. 1, the optical pickup 10 includes an integrated optical unit 1, a collimator lens (light converging means) 2, and an objective lens (light converging means) 3.

A semiconductor laser (light emitting device) 11 (the laser will be described below) is mounted on an integrated optical unit 1, and acts as a light source. The semiconductor laser 11 emits a light beam 20, and the light beam 20 thus emitted is changed into parallel light by the collimator lens 2 and then converted to an optical disk 4 via the objective lens 3. Thereafter, reflected light (the light will be referred to as "returned light" hereinafter) from the optical disk 4 again passes through the objective lens 3 and the collimator lens 2, and then is detected by a photo detector 12, which is mounted on the integrated optical unit 1.

Further, the optical disk 4 includes a substrate 4a, a cover layer 4b via which a light beam transmits, and a recording layer 4c, which is a recording surface formed at an interface between the substrate 4a and the cover layer 4b. An objective lens driving mechanism (not illustrated) causes the objective lens 3 to drive in a focusing direction (direction Z shown in FIG. 1) and in a tracking direction (direction X shown in FIG. 1). As such, even if surface deflection or eccentricity of the optical disk 4 occurs, light is always converted to a predetermined spot of the recording layer 4c.

The optical pickup 10 of the present embodiment employs (i) a light source with a short-wavelength of approximately 405 nm, which light source is provided to the integrated optical unit 1, and (ii) an objective lens 3 with a high numerical aperture (NA) of approximately 0.85. This enables storing and reproducing at high density.

In such case where a light source with short-wavelength and an objective lens with high NA are employed, a large spherical aberration is generated due to variation in thickness of the cover layer 4b of the optical disk 4. To correct the spherical aberration generated due to variation in thickness of the cover layer 4b, the collimator lens driving mechanism (not illustrated) adjusts the position of the collimator lens 2 in an optical-axis direction. Another way of correcting the spherical aberration is that a beam expander driving mechanism (not illustrated) adjusts a distance between two lenses that constitute a beam expander (not illustrated) and are disposed between the collimator lens 2 and the objective lens 3.

The following describes a structure of the integrated optical unit 1, with reference to FIG. 1. The integrated optical unit 1 includes the semiconductor laser 11, which is a light source, the photo detector 12, a polarizing beam splitter (PBS) 14 (light splitting means), a polarized-light diffracting element 15 (diffraction element), a quarter-wave plate 16, and a holding member 17.

The semiconductor laser 11 includes a semiconductor laser chip 11a, which is a light emitting device, and a first package 11b, which accommodates the semiconductor laser chip 11a. The wavelength of the light beam 20, which is laser light emitted from the semiconductor laser chip 11a, is λ=405 nm.

Note that the value mentioned in the present embodiment is merely an example, and the wavelength is not limited to the value.

The light beam 20 is emitted from the semiconductor laser 11 in the form of linearly-polarized light of P-polarized light. Thereafter, the light beam 20 transmits through a surface 14a of the polarizing beam splitter 14 (the surface will be referred to as "PBS surface" hereinafter), and then enters the polarized-light diffracting element 15.

The polarized-light diffracting element 15 includes a first polarized-light hologram element (first hologram region) 31, which diffracts P-polarized light and transmits S-polarized light, and a second polarized-light hologram element (second hologram region) 32, which diffracts S-polarized light and transmits P-polarized light. Hologram patterns and the like of the first polarized-light hologram element 31 and the second polarized-light hologram element 32 will be specifically described below.

After having transmitted through the PBS surface 14a, the light beam 21 of P-polarized light transmits through the second polarized-light hologram element 32 and then is diffracted by the first polarized-light hologram element 31. A hologram pattern is formed on the first polarized-light hologram element 31 to generate three beams for detecting a tracking error signal (the signal will be referred to as "TES" hereinafter). To detect a TES with the use of three beams, a method such as a differential push-pull method (DPP) and a phase-shift differential push-pull method is employed. Detailed description of the hologram pattern and the like will be presented below.

Thereafter, the quarter-wave plate 16 converts the linearly-polarized light of P-polarized light into circularly-polarized light, and then the light thus converted is emitted from the integrated optical unit 1. Returning light from the optical disk 4 enters the integrated optical unit 1 in the form of circularly-polarized light. Thereafter, the quarter-wave plate 16 converts the returned light from circularly-polarized light into linearly-polarized light of S-polarized light. As the foregoing describes, the quarter-wave plate 16 is capable of converting linearly-polarized light of P-polarized light into circularly-polarized light, and converting circularly-polarized light into linearly-polarized light of S-polarized light.

Accordingly, the returned light transmits through the first polarized-light hologram element 31 and is diffracted by the second polarized-light hologram element 32. The returned light thus diffracted is reflected by the PBS surface 14a of the polarizing beam splitter 14 and by a reflecting-mirror surface 14b, and then a zero-order diffracted light beam (non-diffracted light) 22 and a first-order diffracted light beam (diffracted light) 23 enter the photo detector 12. Note that the PBS surface 14a (reflective surface) and the reflecting-mirror surface 14b (reflective surface) of the polarizing beam splitter 14 are parallel to each other.

In the photo detector 12, a photo-detecting device 13 is provided in a second package 12b and is sealed, or protected, by a light transmitting member 12a made of a material such as glass and resin. The light transmitting member 12a is adhered and fixed to the polarizing beam splitter 14, such that the returned light enters the photo-detecting device 13 after returning from the optical disk 4 and outgoing from the polarizing beam splitter 14.

The holding member 17 has a first depressed portion 18 that allows the semiconductor laser 11 to be inserted therein. Further, the holding member 17 is configured in such a way as to allow the polarizing beam splitter 14 to be fixed thereto. The first depressed portion 18 has a shape that allows the position of the semiconductor laser 11 to be adjusted. Further, the polarizing beam splitter 14 is fixed to the holding member 17 by use of a UV adhesive and the like. Concrete shapes will be specifically described below, with reference to FIGS. 7 and 8.

Figure 2:
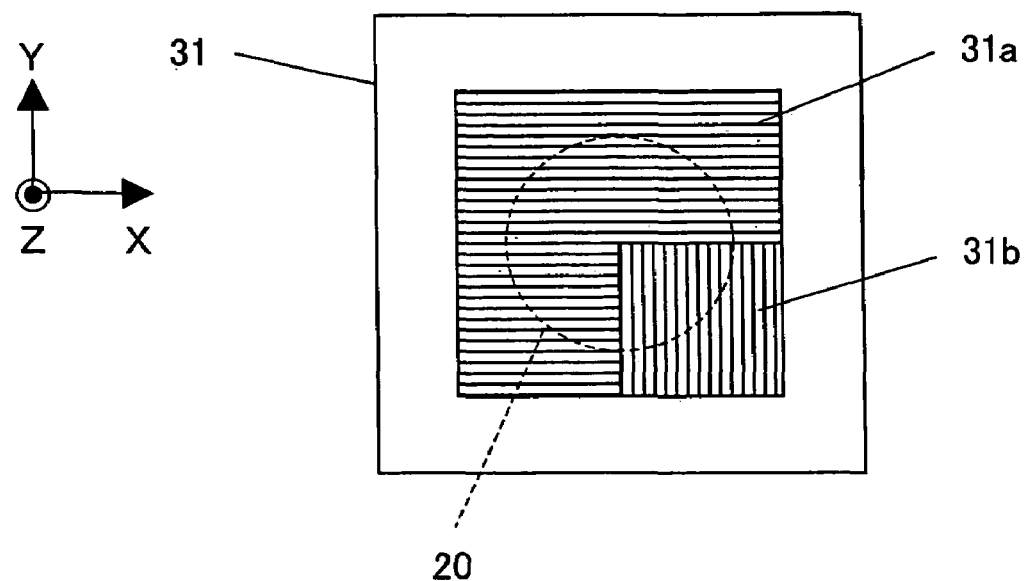
FIG. 2 is a diagram schematically illustrating a hologram pattern of a first polarized-light hologram element employed in an integrated optical unit of the optical pickup.

The following describes the hologram pattern formed on the first polarized-light hologram element 31, with reference to FIG. 2. It is preferable that a lattice pitch formed on the first polarized-light hologram element 31 be designed such that a light beam is completely divided into three beams (one main-beam and two sub-beams) at the photo detector 12.

For example, the lattice pitch is set to be approximately 11 μm, and the distance between the semiconductor laser 11 and the first polarized-light hologram element 31 is set to be equivalent to approximately 5 mm of an optical-path length in the air. As such, there is an interval of approximately 150 μm between a main-beam and a sub-beam at the photo detector 12, and there is an interval of approximately 16 μm between a main-beam and a sub-beam at the optical disk 4. Note that the values mentioned above are merely examples, and the lattice pitch, the distance, and the intervals are not limited to the value.

In the case where a tracking error signal (TES) is detected by using a three-beam method or a differential push-pull method (DPP method), the hologram pattern may be formed in lattice of straight-lines arranged regularly. In the present embodiment, however, the phase-shift DPP method disclosed in Patent Document 2 is employed. In this case, the hologram pattern is formed of two regions, a region 31a and a region 31b. The region 31a and the region 31b are different in phase of the period structure, and the phase difference between the regions 31a and 31b is 180°. In such period structure, an amplitude of a push-pull signal of the sub-beam becomes approximately zero. This makes it possible to cancel offset caused by a shifted objective-lens and a tilted-disk. The more accurately the light beam 20 is placed on the regions 31a and 31b of the first polarized-light hologram element 31, the more suitably the offset is cancelled. Further, the greater the effective diameter of the light beam 20 is, the smaller the influence becomes in the case where the light beam 20 is deviated in position from the regions 31a and 31b due to temporal change or temperature change.

Figure 3:
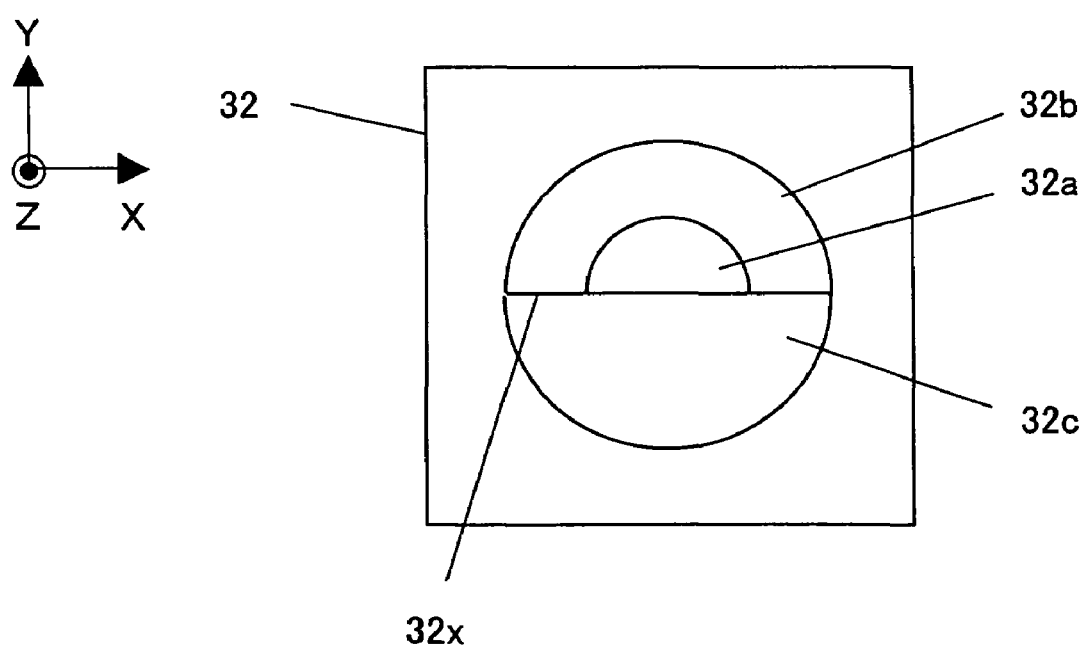
FIG. 3 is a diagram schematically illustrating a hologram pattern of a second polarized-light hologram element employed in an integrated optical unit of the optical pickup.

The following describes the hologram pattern formed on the second polarized-light hologram element 32, with reference to FIG. 3. The hologram pattern is formed of three regions 32a, 32b, 32c. Specifically, the region 32c is one half of a circle divided into two by a border line 32x in X-axis direction that corresponds to a direction perpendicular to track. The other half of the circle is divided by an arc-shape border line, and the region 32a is the inner section of the border line whereas the region 32b is the outer section thereof. The lattice pitch is shortest in the region 32b (diffraction angle is maximum), longest in the region 32c (diffraction angle is minimum), and intermediate in the region 32a. A spherical aberration error signal is detected with the use of at least one of ±first-order diffracted light coming from the regions 32a and 32b. A focus error signal (FES) is detected, by using a knife edge method, with the use of at least one of ±first-order diffracted light coming from the region 32c.

Further, it is possible to integrally produce the first polarized-light hologram element 31 and the second polarized-light hologram element 32 by accurately aligning them with the use of an accurate mask. By this way, the position of the second polarized-light hologram element 32 is adjusted such that a predetermined servo signal is obtained. At the same time, adjustment of the position of the first polarized-light hologram element 31 is also completed. This facilitates adjustment in producing the integrated optical unit 1, and enables highly-accurate adjustment.

Figure 4A:
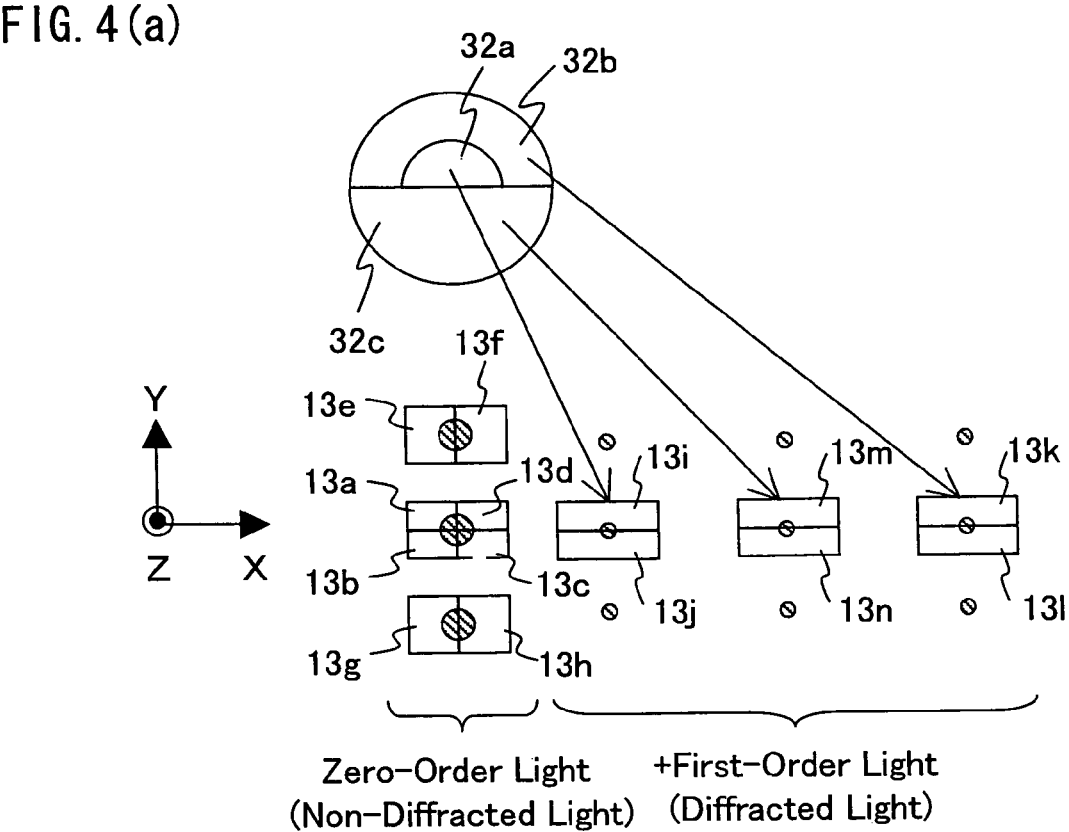
FIG. 4(a) is a diagram schematically illustrating a pattern of a photo detecting section of a photo detector employed in an integrated optical unit of the optical pickup. The figure shows a state of a light beam in the case where no spherical aberration is generated on the pattern of the photo detecting section.
Figure 4B:
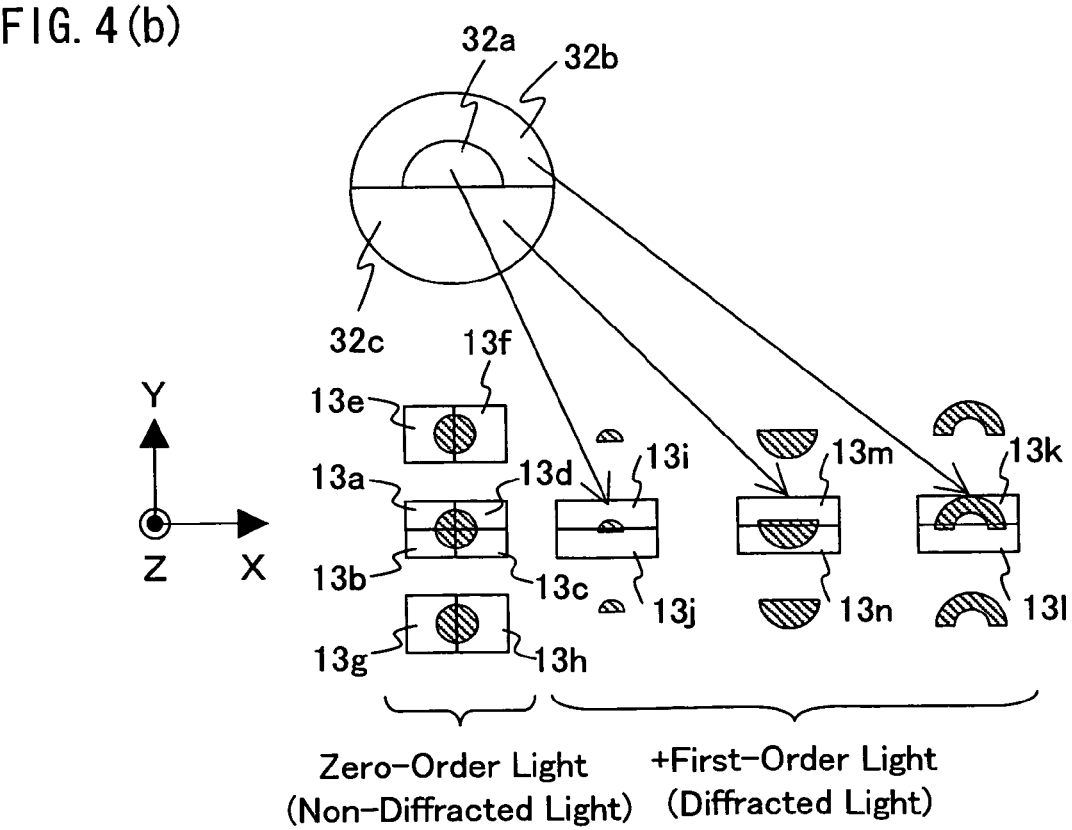
FIG. 4(b) is a diagram illustrating a state of a light beam in the case where an objective lens is brought closer to the optical disk than in the state shown in FIG. 4(a).

The following describes a relationship between (i) a pattern of division of the second polarized-light hologram element 32 and (ii) a pattern of photo-detecting section of the photo detector 12, with reference to FIGS. 4(a) and 4(b).

FIG. 4(a) shows a light beam on the photo-detecting device 13 in the photo detector 12, in the case where the light is focused on the recording layer 4c of the optical disk 4. Specifically, the figure shows the light beam on the photo-detecting device 13 in the state where the respective positions of the collimator lens 2 and the objective lens 3 are adjusted in an optical-axis direction such that the thickness of the cover layer 4b of the optical disk 4 does not cause spherical aberration in the light beam converged by the objective lens 3. Further, the figure also shows a relationship between (i) three regions 32a to 32c of the second polarized-light hologram element 32 and (ii) a traveling direction of first-order diffracted light. Actually, the second polarized-light hologram element 32 is disposed such that the center thereof coincides with the center of the photo-detecting sections 13a to 13d. In the figure, however, illustration of the second polarized-light hologram element 32 is moved in direction Y for the purpose of description.

The optical disk 4 reflects three light beams 21 that are formed in a forward optical-system by the first polarized-light hologram element 31. The three light beams 21 thus reflected are divided, in a backward optical-system, into non-diffracted light beam (zero-order diffracted light) 22 and diffracted light beam (positive first-order diffracted light) 23 by the second polarized-light hologram element 32.

The photo detector 12 includes the photo-detecting device 13 to receive a light beam, the light beam 22 or the light beam 23, that is necessary for detecting an RF (Radio Frequency) signal and/or a servo signal. The photo-detecting device 13 includes 14 pieces of photo-detecting sections 13a to 13n.

Concretely, totally 12 light-beams are formed by the second polarized-light hologram element 32: three non-diffracted light beams (zero-order diffracted light) 22, and nine positive first-order diffracted light beams 23. Among the light beams, the non-diffracted light beam (zero-order diffracted light) 22 is designed to have a certain degree of amount so that a TES is detected by using the push-pull method. Accordingly, the photo-detecting device 13 is disposed so as to be slightly deviated forward or backward with respect a spot where the non-diffracted light beam 22 is converged. In the present embodiment, the photo-detecting device 13 is disposed so as to slightly deviate from the spot backward. As the foregoing describes, a light beam having a certain degree of diameter is converted to a border-line section of the photo-detecting sections 13a to 13d. Therefore, the four photo-detecting sections 13a to 13d are adjusted to produce a same output, so that the respective positions of the non-diffracted light and the photo-detecting device 13 are adjusted.

FIG. 4(b) shows a light beam on the photo-detecting device 13, in the case where the objective lens 3 is brought closer to the optical disk 4 than in the state shown in FIG. 4(a). In this case, the light beam expands, but does not run off the photo-detecting section.

The following describes operations of creating the RF signal and the servo signal, with reference to FIGS. 4(a) and 4(b). Note that output signals of the photo-detecting section 13a to 13n are referred to as Sa to Sn, respectively.

An RF signal (RF) is detected by use of non-diffracted light.

$$RF = Sa + Sb + Sc + Sd$$

A tracking error signal (TES 1) is detected by using the DPD method. Specifically, respective phases of Sa to Sd are compared with one another to detect the TES 1.

A tracking error signal (TES 2) is detected by using the phase-shift DPP method, in accordance with the formula below:

$$TES2 = \{(Sa+Sb)-(Sc+Sd)\} - \alpha\{(Se-Sf)+(Sg-Sh)\}.$$

In the above formula, the variable $\alpha$ is set at an optimum coefficient for canceling an offset caused by objective-lens shift and optical-disk tilt.

The focus error signal (the signal will be referred to as "FES" hereinafter) is detected by a double knife edge method:

$$FES = (Sm-Sn) - \{(Sk+Si)-(Sl+Sj)\}.$$

A spherical-aberration error signal (SAES) is detected by using a detection signal obtained from a light beam divided into the inner section and the outer section by the divided by the arc-shape border line:

$$SAES = (Si-Sj) - \beta(Sk-Sl).$$

In the above formula, the variable $\beta$ is set at an optimum coefficient for canceling an offset caused by the SAES.

The following describes an adjusting method for the integrated optical unit, according to the present embodiment. The polarizing beam splitter 14 and the photo detector 12 are adjusted in advance so as to be disposed at predetermined positions, respectively. The polarizing beam splitter 14 and the photo detector 12 are adhered and fixed with the use of a UV adhesive or the like. Respective outer shapes of the polarizing beam splitter 14 and the photo detector 12 are determined such that, in the positional adjustment, the splitter 14 and the photo detector 12 are disposed at targeted positions by simply aligning their outer shapes.

The polarizing beam splitter 14, onto which the photo detector 12 is adhered and fixed as described above, is adhered and fixed to a predetermined position on the holding member 17. In the present embodiment, relative positions of the semiconductor laser 11 and a division line of the photo-detecting device 13 in the photo detector 12 are adjusted in the manner described below. Accordingly, the photo detector 12 is allowed to be fixed to the polarizing beam splitter 14 less accurately than in the case of conventional semiconductor integrated light emitting apparatuses. Furthermore, the polarizing beam splitter 14 is allowed to be fixed to the holding member 17 less accurately than in the case of conventional semiconductor integrated light emitting apparatuses. In other words, the positioning of the semiconductor laser 11 with respect to the photo detector 12 is allowed to be adjusted afterward, and therefore the photo detector 12 and the holding member 17 are allowed to be mounted on the polarizing beam splitter 14 less accurately than in conventional cases.

The following describes an adjusting method for the semiconductor laser 11 onto which the photo detector 12, the polarizing beam splitter 14, and the holding member 17 are adhered and fixed. Divergent light emitted from the semiconductor laser 11 is directed to the collimator lens 2 so as to be converted into parallel light. The parallel light outgoes from the collimator lens 2, and is reflected at an adjustment mirror or an adjustment corner-cube, both of which are provided separately, then back toward the integrated optical unit 1. The light thus reflected is divided, by the second-polarized-light hologram element 32, into the zero-order diffracted light beam (non-diffracted light) 22 and the first-order diffracted light beam (diffracted light) 23. In the present embodiment, the relative positions of the semiconductor laser 11 and the photo detector 12 are adjusted with the use of the non-diffracted light beam 22.

Figure 5A:
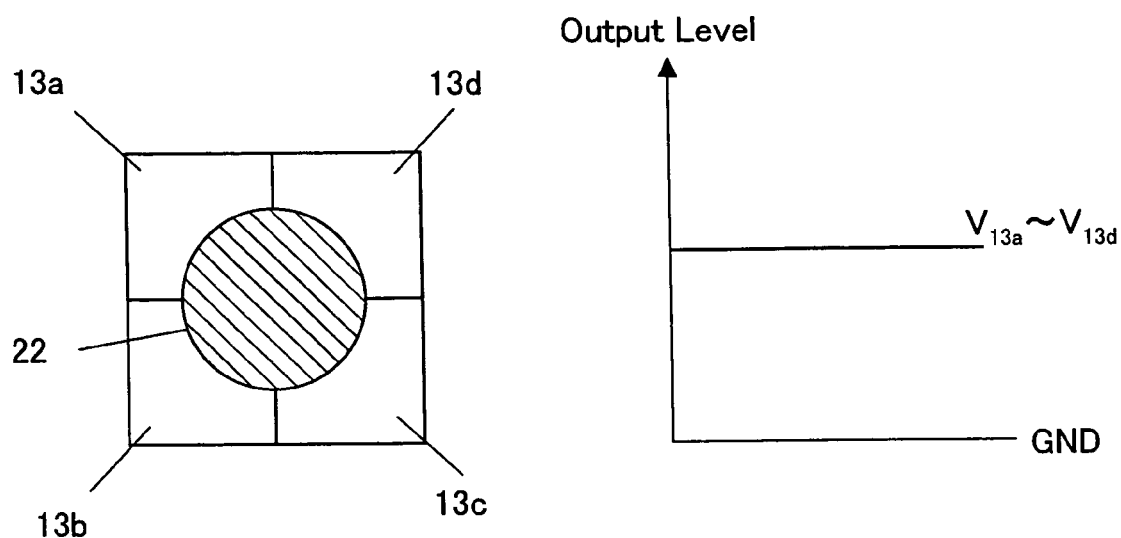
FIG. 5(a) is a schematic diagram explaining a relationship among (i) incident light, (ii) the photo-detecting device, and (ii) an output signal, in the case where positions of a semiconductor laser and a photo detector are adjusted with the use of an output signal supplied by the photo-detecting device of the optical pickup. The figure shows the relationship at the time when the adjustment of the positions has been completed.
Figure 5B:
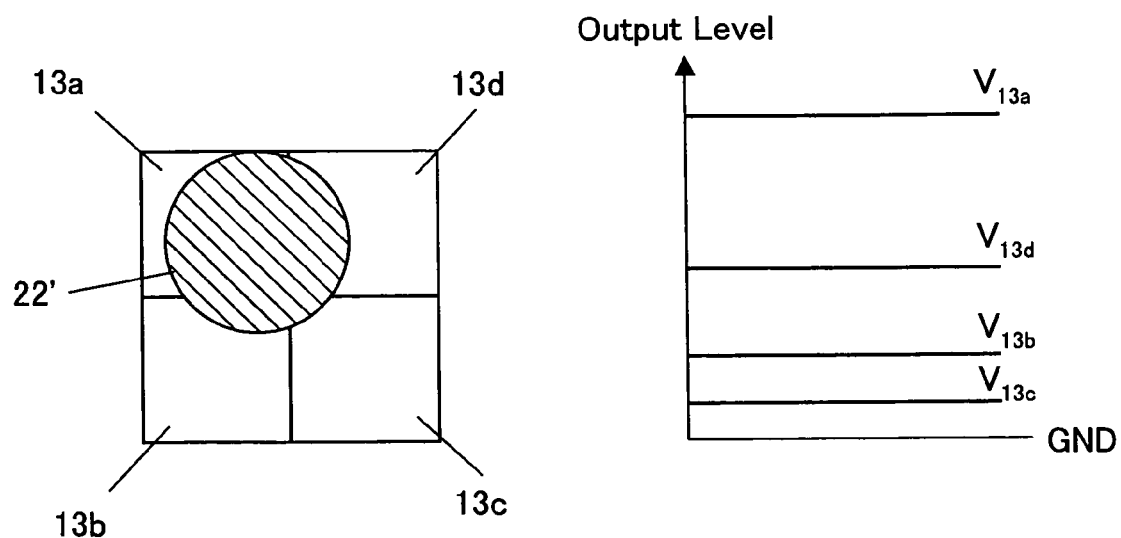
FIG. 5(b) is a diagram showing the relationship at the time when the adjustment is not completed, in contrast to FIG. 5(a).

The following describes an adjusting method, with the use of an output signal supplied by the photo-detecting device 13, the respective positions of the semiconductor laser 11 and the photo detector 12, with reference to FIGS. 5(a) and 5(b).

FIG. 5(a) shows (i) a location of the non-diffracted light beam 22 on the photo-detecting device 13 (left in the figure) and (ii) output signals of the respective photo-detecting sections (right in the figure), at the time when the adjustment of the respective positions of the semiconductor laser 11 and the photo detector 12 has been completed. Hereinafter, outputs from detecting units of the respective photo-detecting sections 13a, 13b, 13c, 13d are referred to as $V_{13a}$, $V_{13b}$, $V_{13c}$, $V_{13d}$, respectively. As it is apparent from the figure, when the adjustment of the relative positions of the semiconductor laser 11 and the photo detector 12 is completed, the output signals $V_{13a}$, $V_{13b}$, $V_{13c}$, $V_{13d}$ of the photo-detecting device 13 in the photo detector 12 become equal to one another.

FIG. 5(b) shows (i) a location of the non-diffracted light beam 22 on the photo-detecting device 13 (left in the figure) and (ii) output signals of the respective photo-detecting sections (right in the figure), at the time when the adjustment has not been completed, yet. As shown in FIG. 5(b), if the non-diffracted light beam 22' is not located at the center of the division line of the photo-detecting device 13, an output is supplied that corresponds to an amount of light having entered the photo-detecting device 13, and therefore the output signals $V_{13a}$, $V_{13b}$, $V_{13c}$, $V_{13d}$ do not take a constant value. In other words, if the relative positions of the semiconductor laser 11 and the photo detector 12 are deviated, an output is supplied that corresponds to an amount of light having entered the photo-detecting device 13, and therefore the output signals $V_{13a}$, $V_{13b}$, $V_{13c}$, $V_{13d}$ do not take a constant value. As the foregoing describes, the output signals of the photo-detecting device 13 are observed, and the relative positions of the semiconductor laser 11 and the photo detector 12 are adjusted such that the output signals of the photo-detecting device 13 become constant. By this way, the integrated optical unit 1 is adjusted accurately.

In the foregoing case, adjustment of the integrated optical unit 1 is performed by adjusting the relative position of the semiconductor laser 11 with respect to the photo detector 12. In other words, only the semiconductor laser 11 is adjusted while the photo detector 12 is kept fixed. Another way of adjusting the integrated optical unit 1 is that the photo detector 12 is adjusted with respect to the semiconductor laser 11. In other words, the holding member 17, onto which the polarizing beam splitter 14 is adhered and fixed, is adjusted with respect to the holding member 17. In this case, only the holding member 17, onto which the polarizing beam splitter 14 is adhered and fixed, may be moved while the semiconductor laser 11 is retained by a jig (not illustrated) that holds the semiconductor laser. By this way, relative positions of the semiconductor laser 11 and the collimator lens 2 remain unchanged, so that an optical axis of incident light from the semiconductor laser 11 to the collimator lens 2 it not tilted. This enables easy and highly-accurate adjustment of the integrated optical unit 1.

Figure 6:
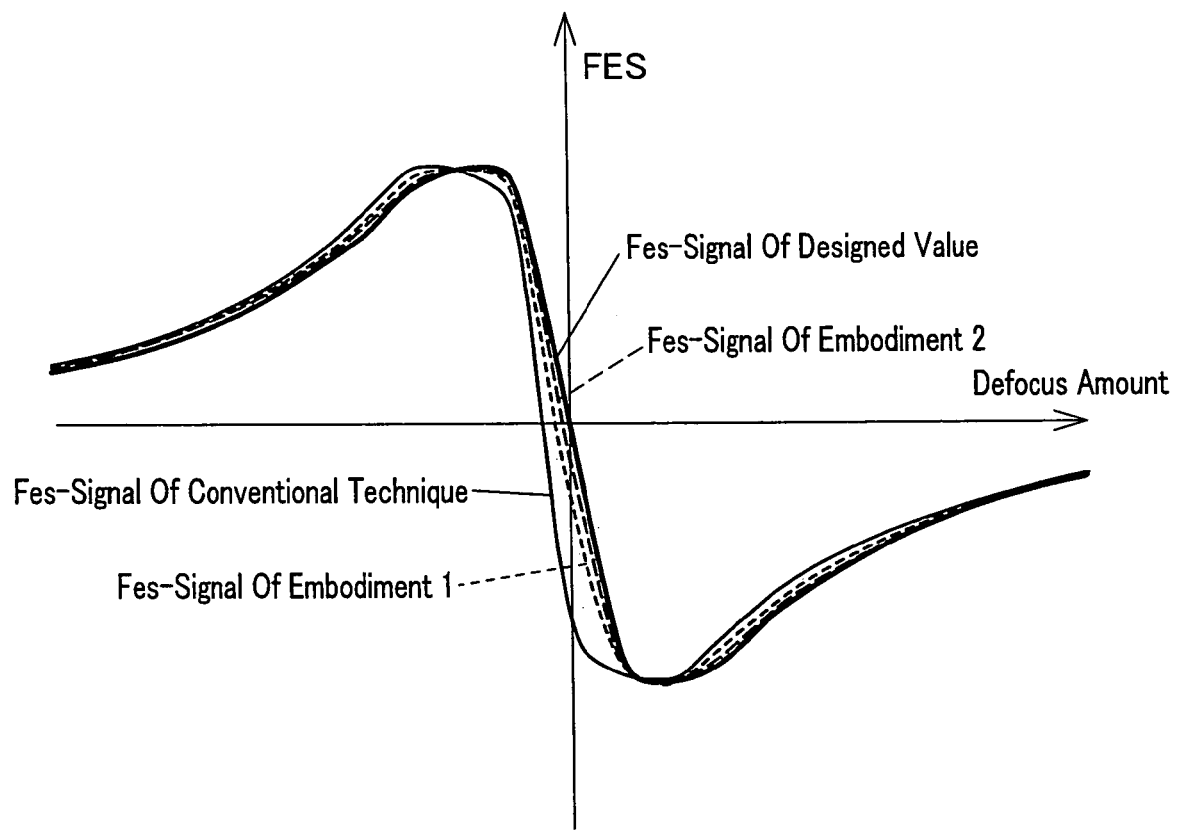
FIG. 6 is a diagram schematically illustrating a focus error signal at the time when there is a tolerance in the optical pickup.

The following describes how the FES is affected if a tolerance occurs in direction Z in the relative positional relationship between the photo detector 12 and the semiconductor laser 11, with reference to FIG. 6. FIG. 6 shows (i) a target FES and (ii) an FES at the time when a tolerance occurs. The figure also shows an FES in the case where the light transmitting member 12a of the photo detector 12 is not provided, which case will be described below. In the figure, a defocus amount of the target FES (indicated by the bold continuous-line) takes the value of zero. This indicates that it is possible to stably control focusing. If a tolerance occurs (indicated by the thin continuous-line), the defocus amount becomes greater than a designed value. If the defocus occurs, it is not possible to focus a spot on the recording layer 4c of the optical disk 4 although focus-control is performed. Therefore, a signal with fine quality cannot be obtained.

Figure 14:
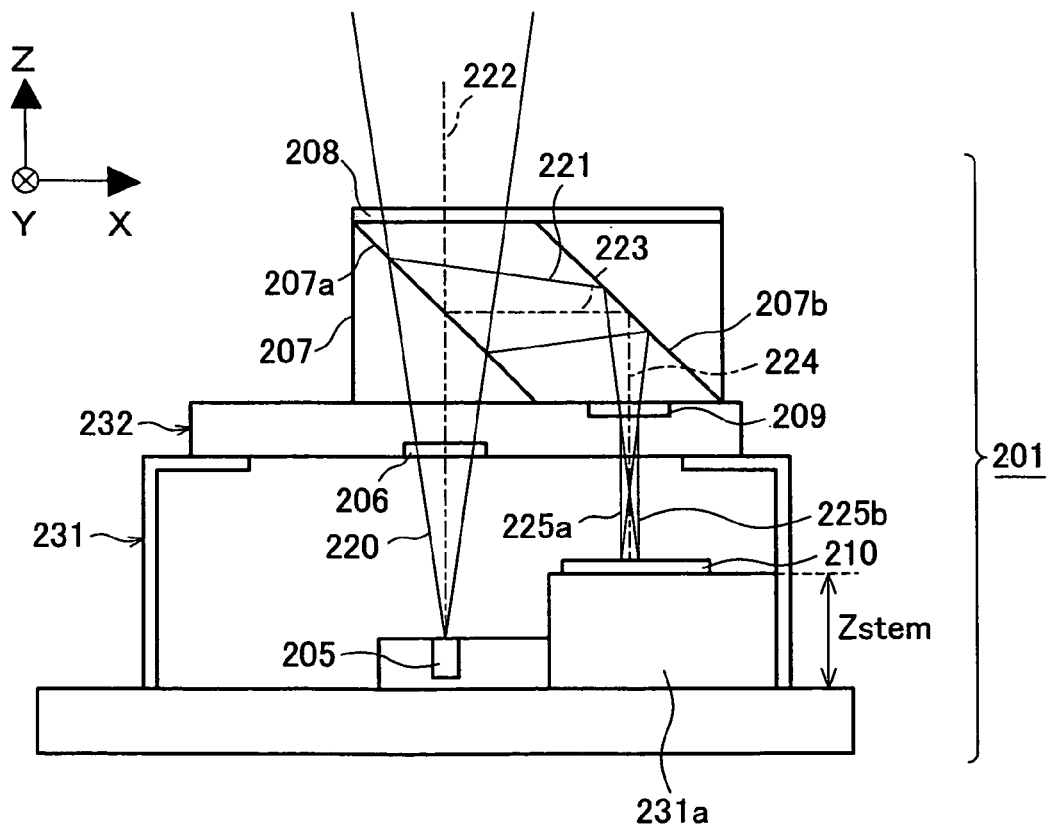
FIG. 14 is a diagram illustrating a structure of a conventional integrated optical unit.

The following describes influences given by tolerances in the present embodiment. Main tolerances in relation to the conventional optical system shown in FIG. 14 include: height tolerance in the package 231 to accommodate the semiconductor laser 205 and the photo-detecting device 210 in one package; thickness tolerance in the glass substrate 232 on which the diffraction, grating 206 and the hologram element 209 are formed; thickness tolerance in the polarizing beam splitter 207; fabrication tolerance in a stem-height (Zstem) to allow the photo-detecting device 210 to be provided onto the stem 231a; and tilt tolerance of the package 231.

On the other hand, main tolerances in relation to the integrated optical unit 1 of the present embodiment include: thickness tolerance in the polarized-light diffracting element 15 on which the first polarized-light hologram element 31 and the second polarized-light hologram element 32 are formed; thickness tolerance in the polarizing beam splitter 14; thickness tolerance in the holding member 17, which holds the first package 11b; and thickness tolerance in the light transmitting member 12a.

In the present embodiment, the same tolerances as in conventional systems may occur in terms of the following tolerances: thickness tolerance in the polarized-light diffracting element 15 on which the first polarized-light hologram element 31 and the second polarized-light hologram element 32 are formed; tolerance in the polarizing beam splitter 14; and thickness tolerance in the holding member 17, which holds the first package 11b.

However, the photo-detecting device 13 is kept accommodated in the second package 12b while in use, and therefore, on the contrary to the conventional systems, it is not necessary to consider an influence of a parameter corresponding to the stem-height (Zstem). The following compares the present embodiment with the stem-height (Zstem) of the conventional technique, with the consideration of influences of the light transmitting member 12a, which is a component that is not provided in conventional techniques.

Many of market-distributed glass materials of optical components, such as the light transmitting member 12a of the present embodiment, are designed such that the maximum tolerance in thickness of the glass materials remains 50 μm or below. Further, if it is assumed that an exemplary reflectivity of light transmitting members is approximately 1.5 (reflectivities of many of popularly-used resin and glass are distributed in the range of 1.4 to 1.7, although the reflectivity differs depending upon materials), an air-equivalent value of the maximum tolerance is 33 μm or below. Therefore, the optical tolerance becomes smaller than actual thickness tolerance of a light transmitting member. On the other hand, the stem, which is provided in the hologram laser and the like, has a maximum tolerance of approximately 80 μm in pressing in mass-production. The tolerance is generated less in the structure using the light transmitting member than in the structure using the stem. In other words, the distance tolerance between the polarizing beam splitter 14 (reflected light outgoes therefrom) and the photo-detecting device 13 in the present embodiment is shorter than that between the glass substrate 232 (reflected light outgoes therefrom) and the photo-detecting device 210 in the conventional technique.

Further, with the package of the conventional technique, if tilt tolerance is generated in the package 231, the returned light (reflected light) 221 falls onto a different part of the photo-detecting device 210, causing defocus. On the other hand, in the present embodiment, the holding member 17 and the photo detector 12 are provided on a lower surface (the degree of evenness is assured at high accuracy by polishing, for example) of the polarizing beam splitter 14. Therefore, there is significantly little influence of tolerance that corresponds to a tilt of the package in the conventional technique.

Thus, it is possible to reduce factors that cause the tolerance, compared to the conventional technique. In other words, the tolerance of the light transmitting member 12a, which seals the second package 12b, becomes less influential than the conventional stem. Furthermore, the holding-member type is less susceptible to the tolerance than the package-type. Therefore, light is accurately accepted by the photo-detecting device 13. As a result, generation of defocus is reduced, and therefore a signal with suitable quality is obtained.

Further, to compensate a defocus amount that is generated, the second polarized-light hologram element 32 included in the integrated optical unit 1 may be rotated for adjustment. However, the first polarized-light hologram element 31 and the second polarized-light hologram element 32 are combined in the integrated optical unit 1. Therefore, when the second polarized-light hologram element 32 is rotated for adjustment, the first polarized-light hologram element 31 is also rotated. As a result, the first polarized-light hologram element 31 generates the sub-spots (±first-order diffracted light) such that the sub-spots are tilted with respect to an information track of the optical disk 4, on which information track the main-spot (zero-order diffracted light) is located.

In the case where the DPP method is adopted in tracking servo, the sub-spots are generally provided on an adjacent track to the main-spot. In the case of the phase-shift DPP method, it is not necessary to provide the sub-spots on the adjacent track, but it is preferable that the sub-spots have as few tilt as possible with respect to the main-beam.

Further, to provide the sub-spots on the adjacent track, the entire integrated optical unit 1 is rotated. However, in the case where the integrated optical unit 1 is rotated for adjustment, as the number of rotations increases, the optical pickup 10 becomes thicker. Furthermore, the number of rotations increases, as the defocus amount increases that is generated due to tolerance. In comparison with the integrated optical unit 1, the present embodiment allows an initial defocus amount generated due to tolerance to be kept low, so that the number of rotations of the second polarized-light hologram element 32 decreases. This allows an amount of adjustment in rotations of the integrated optical unit 1 to be reduced. Thus, it becomes possible to realize the optical pickup 10 in thinner shape.

The following describes in detail (i) structures of components that contribute to adjustment of the integrated optical unit 1 of the present embodiment and (ii) an adjusting method for the components, with reference to FIGS. 7 to 10.

Figure 7:
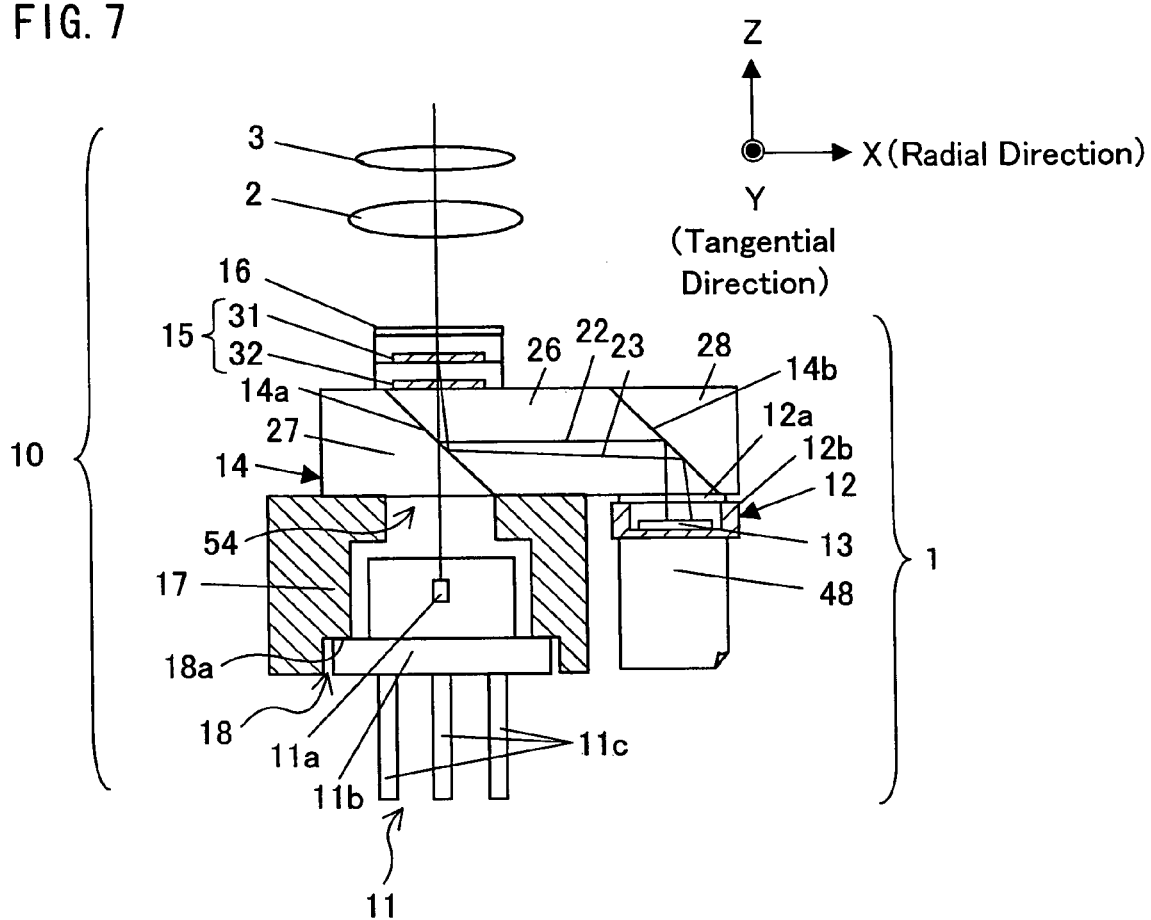
FIG. 7 is a side view of the optical pickup.

FIG. 7 shows a side view of the optical pickup 10 of the present embodiment.

As described above, the optical pickup 10 of the present embodiment includes the integrated optical unit 1, the collimator lens 2 (light converging means), and the objective lens 3 (light converging means).

In this case, the light converging means may only include the objective lens 3. However, with the collimator lens 2, which does not move with respect to the optical pickup 10, it becomes possible to highly accurately (i) adjust, on the basis of the semiconductor laser 11 and the collimator lens 2, an optical axis of the optical pickup 10 and (ii) provide the polarized-light diffracting element 15 and the like.

Further, the integrated optical unit 1 includes the semiconductor laser 11, the photo detector 12, the polarizing beam splitter (PBS) 14, which acts as dividing means, the polarized-light diffracting element 15, the quarter-wave plate 16, and the holding member 17. Further, the semiconductor laser 11 includes the semiconductor laser chip 11a, which acts as a light emitting device, and the first package 11b, which accommodates the semiconductor laser chip 11a.

The holding member 17 includes the first depressed portion 18. The first package 11b is disposed in such a way as to be in contact with a surface 18a of the first depressed portion 18, which surface 18a is parallel, in directions X-Y, to the first package 11b. Further, to efficiently release heat emitted by the semiconductor laser 11, the holding member 17 is made of, for example, a metal or a resin that is excellent in releasing heat. Further, the holding member 17 includes a window section 54 via which the light beam 20 emitted by the semiconductor laser 11 transmits. Further, the polarizing beam splitter 14 is disposed on an upper section of the holding member 17.

The polarizing beam splitter 14 includes a first glass 26, a second glass 27, and a third glass 28. Further, the polarizing beam splitter 14 is an optical element formed in rectangular-parallelepiped shape as a whole. Specifically, the second glass 27 and the third glass 28 are adhered to both sides of the first glass 26, which is in parallelogram shape, respectively. A first contact-surface constituted of the first glass 26 and the second glass 27 is the PBS surface 14a, and divides (i) the light beam 20 emitted by the semiconductor laser 11 and (ii) the returned light from the optical disk 4.

Light reflected by the optical disk 4 is reflected by direction X, by the PBS surface 14a formed on the first contact-surface, and is separated from outgoing light. In the figure, (i) the zero-order diffracted (transmitted) light beam 22 and (ii) one of the negative first-order diffracted light beam 23 are shown to exemplify the reflected light divided (diffracted) by the second polarized-light hologram element 32. The diffracted light is reflected by the reflecting-mirror surface 14b, which is formed on the second contact-surface constituted of the first glass 26 and the third glass 28. The diffracted light thus reflected outgoes, downward in the figure, from the polarizing beam splitter 14, and detected by the photo detector 12. The PBS surface 14a formed on the first contact-surface and the reflecting-mirror surface 14b formed on the second contact-surface are constituted of two parallel surfaces of the first glass 26, which is in parallelogram shape.

The photo detector 12 includes the photo-detecting device 13, the second package 12b, which accommodates the photo-detecting device 13, and the light transmitting member 12a. The second package 12b is made of ceramics. The light transmitting member 12a is fixed onto an upper section of the second package 12b to seal the photo-detecting device 13. The photo detector 12 is fixed to a lower surface of the polarizing beam splitter 14. Further, a flexible substrate 48 is provided on a lower surface of the photo detector 12 to take out a signal. Note that the flexible substrate 48 may be coupled with a lead terminal 11c of the semiconductor laser 11, when necessary.

Figure 8:
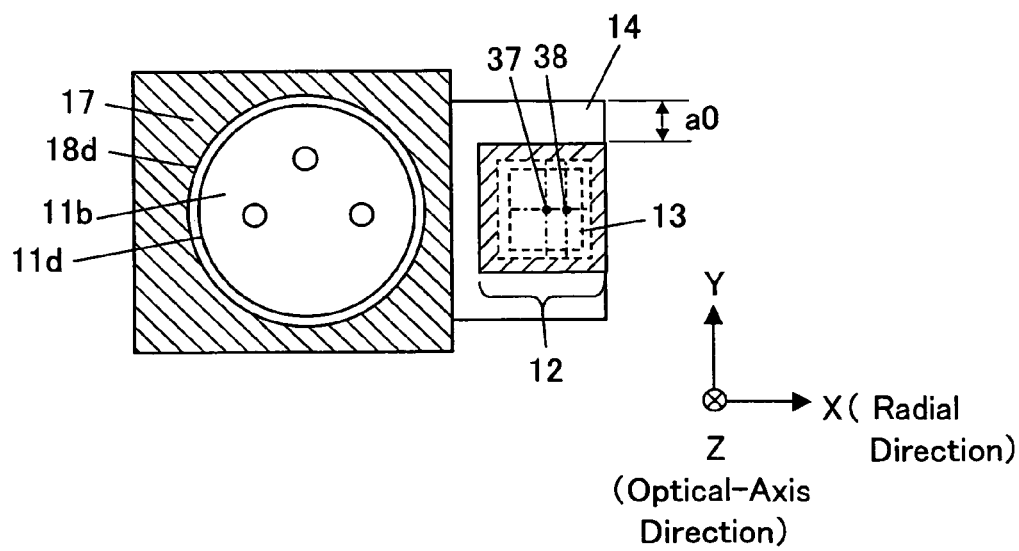
FIG. 8 is a plan view illustrating a bottom surface of an integrated optical unit of the optical pickup.

FIG. 8 is a diagram showing a bottom surface of the integrated optical unit 1 of the present embodiment. A most-outer shape 11d of a bottom surface of the first package 11b of the semiconductor laser 11 is in circular shape. The holding member 17 has a first depressed portion 18, which is greater in diameter than the most-outer shape 11*d* of the first package 11*b*. In other words, it is possible to insert the first package 11*b* into the first depressed portion 18 such that there is a space (clearance) in an arbitrary direction in the flat-surface X-Y that is orthogonal to an optical axis direction (direction Z shown in FIG. 8).

It is preferable that the integrated optical unit 1 of the present embodiment is produced by the steps of: placing the polarizing beam splitter 14, onto which the photo detector 12 is adhered and fixed in advance, on the holding member 17; and conducting adjustment, after the placing, such that the non-diffracted light beam 22 and the first-order diffracted light beam 23 respectively fall onto predetermined positions on the photo-detecting device 13 of the photo detector 12. In other words, to conduct the adjustment, the photo detector 12 is not moved solely, and therefore it is preferable to relatively move, with respect to the semiconductor laser 11, (a) the polarizing beam splitter 14 to which the photo detector 12 is adhered and fixed, or (b) the holding member 17 to which the polarizing beam splitter 14 is adhered and fixed, which polarizing beam splitter 14 includes the photo detector 12 adhered and fixed to the polarizing beam splitter 14.

This adjustment is possible because, as described above, it is possible to insert the first package 11*b* into the first depressed portion 18 such that there is a space (clearance) in an arbitrary direction in the flat-surface X-Y. In this case, the respective positions of the semiconductor laser 11 and the holding member 17 are adjusted on the flat-surface X-Y. Therefore, it is not necessary to consider adjustment of the position in direction Z (optical axis direction). This facilitates adjustment of the semiconductor laser 11 and the photo detector 12. Further, the inner surface of the first depressed portion 18 and the outer surface of the semiconductor laser 11 may have a space (clearance) not only in the flat-surface X-Y but also in between the semiconductor laser 11 and the inner surface of the first depressed portion 18 in such a way as to surround the outer surface of the semiconductor laser 11, and the position of the semiconductor laser 11 may be adjusted at an arbitrary position in the first depressed portion 18. Note that the "inner surface" indicates a surface that becomes opposite to the outer surface of the semiconductor laser (light source) 11 when the semiconductor laser (light source) 11 is inserted in the depressed portion. Further, the "outer surface" indicates a surface that becomes opposite to the inner surface of the depressed portion when the semiconductor laser (light source) 11 is inserted in the depressed portion.

The photo detector 12 fixed to the lower surface of the polarizing beam splitter 14 accommodates the photo-detecting device 13 therein. The photo-detecting device 13 and other components are indicated by the broken line. The inner broken-line indicates the photo-detecting device 13, whereas the outer broken-line indicates an accommodation section of the second package 12*b* of the photo detector 12. Two intersecting points of the three broken-lines indicate where the non-diffracted light beam 22 and the first-order diffracted light beam 23 should fall onto the photo-detecting device 13. The black dots indicate where the non-diffracted light beam 22 and the first-order diffracted light beam 23 actually fall. Specifically, a spot 37 indicates where the non-diffracted light beam 22 falls onto, and a spot 38 indicates where the first-order diffracted light beam 23 falls. Note that the spot 37, which is the intersection of the broken lines where the non-diffracted light beam 22 falls onto, corresponds to an intersection of division lines of the photo-detecting sections 13*a* to 13*d* in FIG. 5(*a*).

Further, FIG. 8 shows the case where the photo detector 12 is adhered at a predetermined position of the polarizing beam splitter 14. In other words, the figure shows the case where the photo detector 12 is positioned downward by a0 from an upper edge of the polarizing beam splitter 14, and is aligned along a right-side edge. Here, it is indicated that the spot 37 and the spot 38 are formed at positions (intersections of the broken lines) where the non-diffracted light beam 22 and the first-order diffracted light beam 23 should fall. Note that illustration of the flexible substrate 48 is omitted in the figure for the purpose of the above description.

Figure 9:
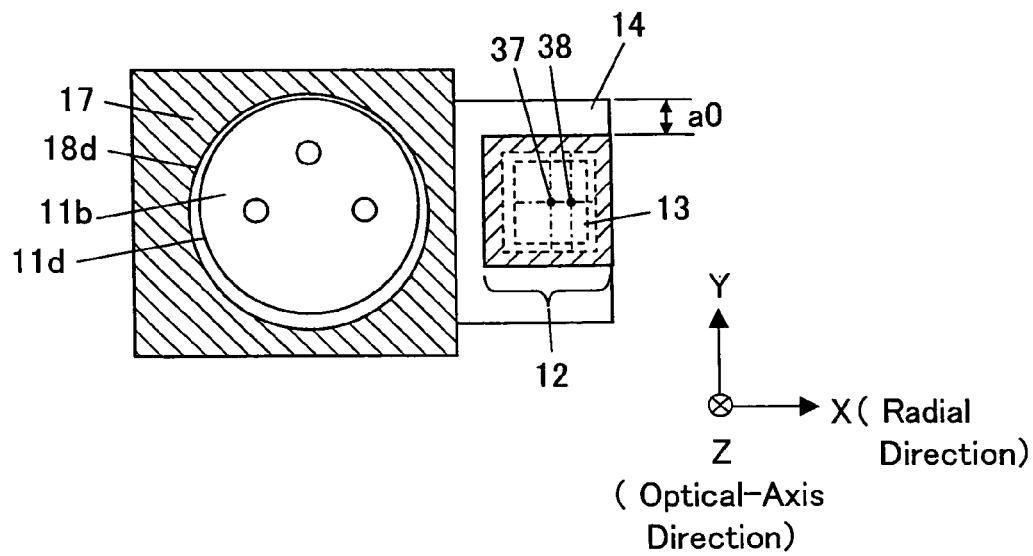
FIG. 9 is a plan view illustrating a bottom surface of an integrated optical unit of the optical pickup.
Figure 10:
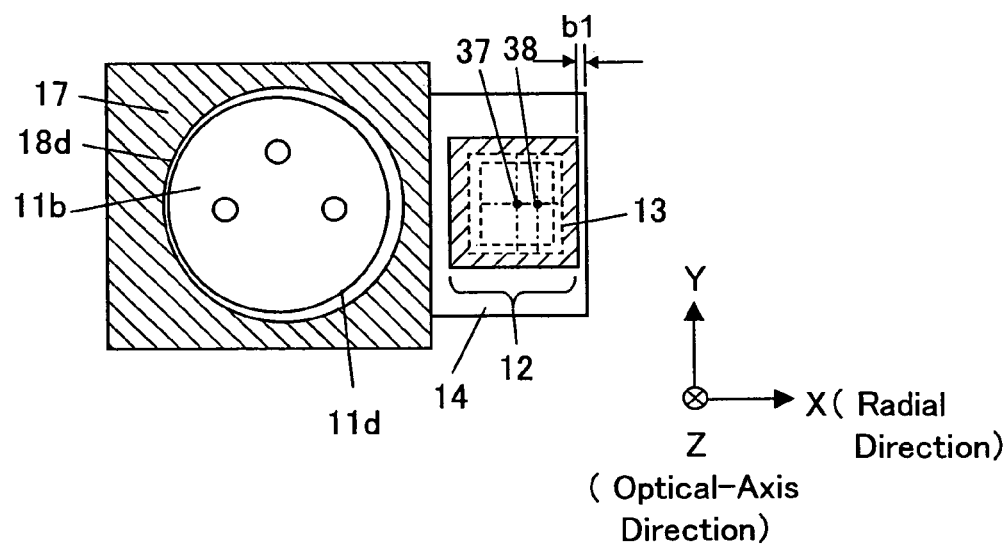
FIG. 10 is a plan view illustrating a bottom surface of an integrated optical unit of the optical pickup.

FIGS. 9 and 10 respectively show statuses after adjustment is performed, in the cases where the photo detector 12 is adhered to the polarizing beam splitter 14 such that the photo detector 12 is provided on a different position from a predetermined position.

As shown in FIG. 9, the photo detector 12 is adhered to the polarizing beam splitter 14 such that the photo detector 12 is positioned downward by a1 from an upper edge of the polarizing beam splitter 14. At this time, a0>a1. In this case, if the first package 11*b* of the semiconductor laser 11 is at the center of the first depressed portion 18 as shown in FIG. 8, the respective positions of the spots 37 and 38 would be deviated from the intersections of the broken lines, downward (−direction Y) in the figure. However, by moving the first package 11*b* upward (+direction Y) in the figure within the clearance (space) of the first depressed portion 18, the spots 37 and 38 coincide with the predetermined spots (two intersections of the three broken lines) onto which the light beams are suppose to fall, as shown in FIG. 9. In other words, it becomes possible to cause the non-diffracted light beam 22 and the first-order diffracted light beam 23 to fall onto predetermined spots, respectively.

Further, in FIG. 10, the photo detector 12 is adhered to the polarizing beam splitter 14 such that the photo detector 12 is away, by b1, from a right-side edge of the polarizing beam splitter 14. At this time, b1>0. In this case, if the first package 11*b* of the semiconductor laser 11 is at the center of the first depressed portion as shown in FIG. 8, the respective positions of the spots 37 and 38 are deviated from the intersections of the broken lines, rightward (+direction X) in the figure. However, by moving the first package 11*b* leftward (−direction X) in the figure, within the clearance (space) of the first depressed portion 18, it becomes possible to cause the spots 37 and 38 to coincide with the predetermined spots (two intersections of the three broken lines) onto which the light beams are supposed to fall, as shown in FIG. 10. In other words, it becomes possible to cause the non-diffracted light beam 22 and the first-order diffracted light beam 23 to fall onto the predetermined spots. Note that illustration of the flexible substrate 48 in the figure is omitted for the purpose of the above description.

Further, light (outgoing light) from the semiconductor laser 11 and reflected light (returning light) from the optical disk 4 are separated by using the PBS surface 14*a* formed at a surface where the first glass 26, which is in parallelogram, and the second glass 27, which is an adjacent member to the first glass 26, join. By this way, it becomes possible to separate an optical path from the semiconductor laser 11 to the PBS surface (light-dividing surface) 14*a*, and an optical path from the PBS surface 14*a* to the photo detector 12. This allows a distance to be ensured between the semiconductor laser 11 and the photo detector 12. Accordingly, even in the case where the integrated optical unit 1 is constituted of components that are large in dimension (larger than those of a conventional integrated optical unit on which bare chips are mounted), such as the semiconductor laser 11 built in a general-purpose package whose shape is standardized or uniform in accordance with industrial standards, the photo detector 12, and the like, it is possible to easily dispose the respective components and realize an integrated structure.

Further, in the semiconductor laser 11, the semiconductor laser chip 11a is sealed in the first package 11b. Further, the photo detector 12, in which the photo-detecting device 13 is sealed in the second package 12b, is adhered to the polarizing beam splitter 14. Therefore, stray light (laser light that is irregularly reflected inside the holding member 17, inside the polarizing beam splitter 14, and the like) that is generated due to reflection in the integrated optical unit 1 is prevented from entering the photo detector 12. Accordingly, it becomes possible to improve stability in operations of the integrated optical unit 1 and the optical pickup 10 using the integrated optical unit 1.

Further, an angle at which the light beam 20 from the semiconductor laser 11 is incident on the polarizing beam splitter 14 is maintained constant (vertical in the present embodiment). By this way, even when the positional relationship between the semiconductor laser 11 and the polarizing beam splitter 14 is deviated, for example, in direction X as shown in FIG. 9, or in direction Y as shown in FIG. 10, neither the optical-path length from the semiconductor laser 11 and the optical disk 4 nor the optical-path length from the optical disk 4 to the photo detector 12 changes. Accordingly, it becomes possible to prevent a focus status with respect to the optical disk 4 from changing. Furthermore, it becomes possible to adjust the spots mentioned above.

Embodiment 2

Figure 11:
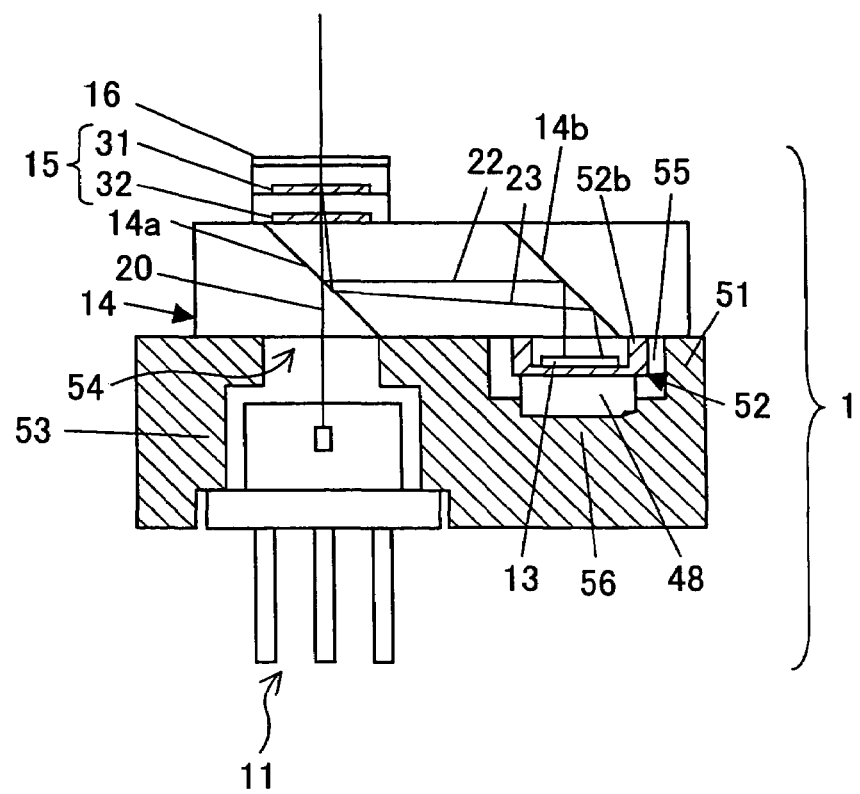
FIG. 11 is a side view of an integrated optical unit of another embodiment of the present invention.

The following describes another embodiment of the present invention, with reference to FIG. 11. An integrated optical unit 1 of the present embodiment is different from that of Embodiment 1 in that a second depressed portion 55 is provided to allow a photo detector 52 to be inserted in a holding member 53. Furthermore, the present embodiment is different from Embodiment 1 in that the photo detector 52 does not include a light transmitting member 12a, and an upper end part of a second package 12b is directly adhered and fixed to a lower surface of a polarizing beam splitter 14. Note that differences between the present embodiment and Embodiment 1 will be described in the present embodiment, and, in view of convenience in description, the same reference numerals are given to the members that have the same functions as those described in Embodiments 1 and 2, and description thereof is omitted.

FIG. 11 shows a side view of the integrated optical unit 1 of the present embodiment. As shown in FIG. 11, the holding member 53 has the second depressed portion 55, so that the protruded portion 51 is formed. With the above structure, it is possible for the polarizing beam splitter 14 to be sustained by the protruded portion 51 formed on the holding member 53. This improves stability in placing the polarizing beam splitter 14 on the holding member 53. Further, the holding member 53 has the second depressed portion 55, so that the bottom section 56 is formed. With the protruded portion 51 and the bottom section 56, it becomes possible to protect the photo detector 52, which is adhered to the lower surface of the polarizing beam splitter 14 and protrudes therefrom. Accordingly, the photo detector 52 is prevented from coming off the polarizing beam splitter 14 due to accidentally-applied external force.

Further, a terminal (not illustrated) for receiving and supplying a signal, and the flexible substrate 48, which is coupled to the terminal by soldering, are provided on the bottom section of the photo detector 52. It is also possible to electrically and mechanically protect the terminal and the flexible substrate 48 with the protruded portion 51 and the bottom section 56. Therefore, the coupling section, the flexible substrate 48 and the like are prevented from electrically or mechanically destroyed due to accidentally-applied external force or electrical contact.

Further, in comparison to Embodiment 1, the light transmitting member 12a is not provided, and the second package 52b of the photo detector 52 is directly provided on the lower surface of the polarizing beam splitter 14. In other words, there is only one single optical medium (air in the present embodiment) between the polarizing beam splitter 14 and the photo-detecting device 13. Therefore, it is possible to ignore influence of tolerance of the light transmitting member 12a. The following describes the FES in the present embodiment, with reference to FIG. 6. Note that factors, besides the light transmitting member 12a, of generating the tolerance and influence of the tolerance are equivalent to those in Embodiment 1. As it is apparent from FIG. 6, the defocus amount of FES is smaller in the present embodiment than in Embodiment 1. Accordingly, it is not necessary to take the tolerance of the light transmitting member 12a into consideration, and therefore it becomes possible to reduce generation of defocus. As a result, the amount of adjustment by rotating the integrated optical unit 1 is reduced, and therefore an optical pickup 10 in thinner shape is realized.

Embodiment 3

Figure 12:
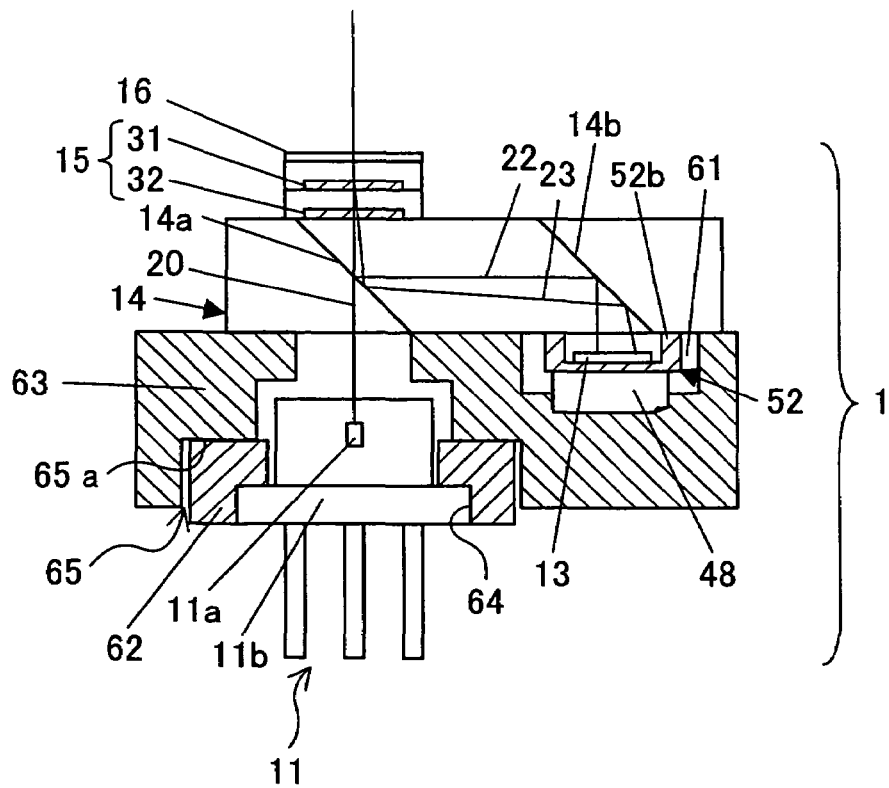
FIG. 12 is a side view of an integrated optical unit of another embodiment of the present invention.
Figure 13:
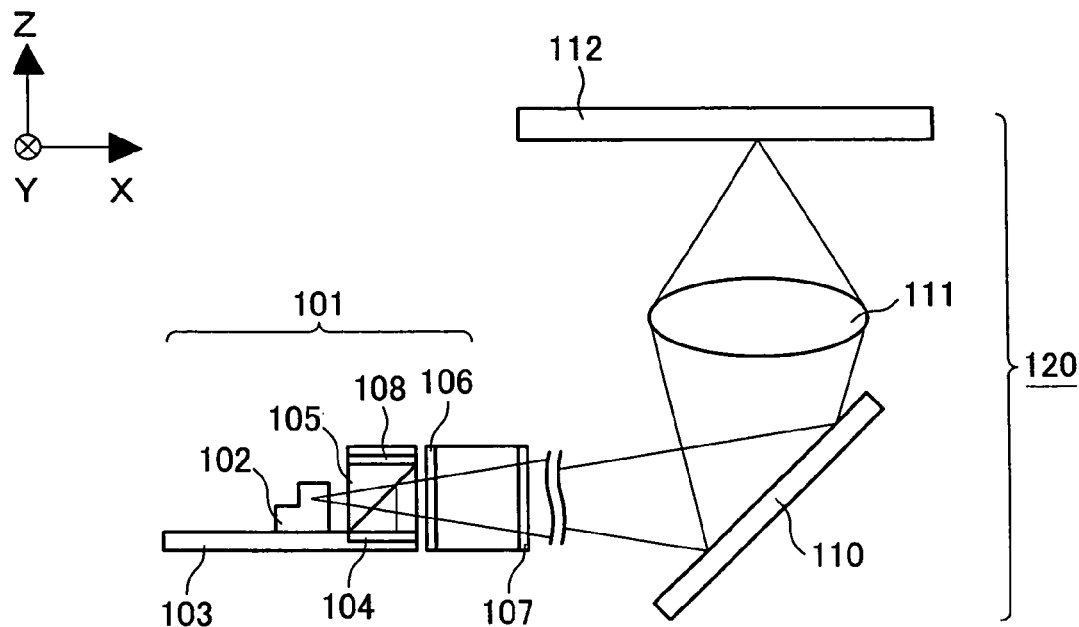
FIG. 13 is a diagram illustrating a structure of a conventional optical pickup.

The following describes another embodiment of the present invention, with reference to FIG. 12. An integrated optical unit 1 of the present embodiment is different from those of Embodiments 1 and 2 in that the integrated optical unit 1 includes an adjusting member 62 onto which a first package 11b of a semiconductor laser 11 is fixed, and that the adjusting member 62 is provided so as to be in contact with a surface 65a, which extends in directions X-Y. Note that differences between the present embodiment and Embodiments 1-2 will be described in the present embodiment, and, in view of convenience in description, the same reference numerals are given to the members that have the same functions as those described in Embodiments 1 and 2, and description thereof is omitted.

FIG. 12 shows a side view of an integrated optical unit 1 of the present embodiment. As shown in FIG. 12, the adjusting member 62 is in ring-shape and has a hollow section 64. A first package 11b is fitted into a hollow section 64 of the adjusting member 62 so that the first package 11b is fixed to the hollow section 64. A light source is constituted of a semiconductor laser chip 11a, which acts as a light emitting device, a first package 11b, which accommodates the semiconductor laser chip 11a, and the adjusting member 62, which is fixed to the first package 11b. In other words, the semiconductor laser 11 and the adjusting member 62 are integrated.

An upper section of the first package 11b protrudes from the adjusting member 62, and a light beam 20 emitted by the semiconductor laser 11 is reachable to the polarizing beam splitter 14. An outer shape of the adjusting member 62 is in circle, and the first depressed portion 65 of the holding member 63 is greater in diameter than the outer shape (circular shape) of the adjusting member 62.

Illustration of the present embodiment in figure is omitted, but the relationship between the first depressed portion 18 of the holding member 17 and the most-outer shape 11d (circular shape) of the first package 11b of the semiconductor laser 11 in Embodiment 1, which relationship is shown in FIG. 7, corresponds to the relationship between the first depressed portion 65 of the holding member 63 and the outer shape (circular shape) of the adjusting member 62 in the present embodiment. In other words, it is possible to insert the adjusting member 62 into the first depressed portion 65 such that there is a clearance (space) in an arbitrary direction in a flat-surface X-Y that is orthogonal to the optical axis direction (direction Z shown in FIG. 7).

Therefore, even if the photo detector 52 is adhered to the polarizing beam splitter 14 such that the photo detector 52 is deviated from a predetermined position, it is possible to adjust, by moving the adjusting member 62 in the flat-surface X-Y, a spot on the photo detector 52 to coincide with a predetermined position for the spot to fall onto.

Note that, in order to efficiently release heat emitted by the semiconductor laser 11, the adjusting member 62 is made of material such as metal or resin that is excellent in releasing heat.

Applicability of the structure according to the present embodiment that uses the adjusting member 62 is not limited to the holding member 63 having the second depressed portion 61. The structure is also applicable to the holding member 17 described in Embodiment 1, which holding member 17 does not have the second depressed portion 61.

Location of spots is adjusted in Embodiments 1 to 3 by relatively moving, in the flat-surface X-Y, the holding member 17 and the first package 11b of the semiconductor laser 11, the holding member 53 and the first package 11b, or the holding member 63 and the adjusting member 62. However, in order to conduct the adjustment without moving the optical axis of the collimator lens 2 and the semiconductor laser 11, both of which are built in the optical pickup 10, it is more preferable to move, without moving the first package 11b of the semiconductor laser 11 or the adjusting member 62, the holding member 63 on which the polarizing beam splitter 14 (the photo detector 52 is already mounted rigidly) is provided.

In Embodiments 1 to 3, the second polarized-light hologram element 32, which causes a servo signal to be generated, is disposed on a closer side to the light source in the polarized-light diffracting element 15. Further, the embodiments only describe the case in which the reflected light from the optical disk 4 is caused to transmit through the first polarized-light hologram element 31, which causes three beams to be generated, and then the second polarized-light hologram element 32 causes the reflected light to be diffracted. However, a similar advantage is produced in the case where the first polarized-light hologram element 31, which causes three beams to be generated, is disposed on a closer side to the light source, the second polarized-light hologram element 32 is disposed on a farther side to the light source.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to an optical pickup used in recording information to, or reproducing information from, an optical storage medium such as an optical disk.

What is claimed is:

1. An integrated optical unit, comprising:
    a light source that emits light with respect to an optical storage medium;
    a diffraction element that divides returned light returning from the optical storage medium;
    light splitting means for directing the returned light in a direction that is different from a direction in which the light source is provided;
    a photo detector that detects the returned light; and
    a holding member in which the light source and the light splitting means are provided,
    the photo detector being fixed to a location on the light splitting means from which location the returned light outgoes.

2. The integrated optical unit according to claim 1, wherein the light source includes:
    a light emitting device; and
    a first package that accommodates the light emitting device.

3. The integrated optical unit according to claim 1, wherein the light source includes:
    a light emitting device;
    a first package to accommodate the light emitting device; and
    an adjusting member that is fixed to the first package.

4. The integrated optical unit according to claim 1, wherein the holding member has a first depressed portion that allows the light source to be inserted therein.

5. The integrated optical unit according to claim 4, wherein there is a clearance between an inner surface of the first depressed portion and an outer surface of the light source inserted in the first depressed portion.

6. The integrated optical unit according to claim 4, wherein the holding member has a second depressed portion that allows the photo detector to be inserted therein.

7. The integrated optical unit according to claim 1, wherein the photo detector comprises:
    a photo-detecting device; and
    a second package to accommodate the photo-detecting device.

8. The integrated optical unit according to claim 7, wherein the second package is fixed directly to the light splitting means.

9. The integrated optical unit according to claim 7, wherein an optical medium is present between the light splitting means and the photo-detecting device.

10. The integrated optical unit according to claim 9, wherein the optical medium is air.

11. The integrated optical unit according to claim 1, wherein the photo detector comprises:
    a photo-detecting device;
    a second package to accommodate the photo-detecting device; and
    a light transmitting member that allows the returned light to transmit.

12. The integrated optical unit according to claim 1, wherein the diffraction element is a polarized-light diffracting element.

13. The integrated optical unit according to claim 1, wherein the light splitting means includes two reflective surfaces that are parallel to each other.

14. An optical pickup, comprising at least:
    an integrated optical unit that comprises:
        a light source that emits light with respect to an optical storage medium;
        a diffraction element that divides returned light returning from the optical storage medium;
        light splitting means for directing the returned light in a direction that is different from a direction in which the light source is provided;

a photo detector that detects the returned light; and
a holding member in which the light source and the light splitting means are provided,
the photo detector being fixed to a location on the light splitting means from which location the returned light outgoes; and
light converging means for converging light to the optical storage medium.

15. The optical pickup according to claim 14, wherein the light converging means includes at least a collimator lens.

16. An adjusting method for an integrated optical unit, the integrated optical unit comprising:
a light source that emits light with respect to an optical storage medium;
a diffraction element that divides returned light returning from the optical storage medium;
light splitting means for directing the returned light in a direction that is different from a direction in which the light source is provided;
a photo detector that detects the returned light; and
a holding member in which the light source and the light splitting means are provided,
the photo detector being fixed to a location on the light splitting means from which location the returned light outgoes,
said adjusting method comprising the step of:
adjusting a location on the photo detector on which location the returned light is incident, by, while one of the light source and the photo detector is being fixed to the light splitting means, relatively moving, with respect to the one of the light source and the photo detector, the other one of the light source and the photo detector.

17. The adjusting method according to claim 16, comprising the step of adjusting, in accordance with an output signal supplied by the photo detector, a location on the photo detector on which location the returned light is incident.

18. An adjusting method for an integrated optical unit, the integrated optical unit comprising:
a light source that emits light with respect to an optical storage medium;
a diffraction element that divides returned light returning from the optical storage medium;
light splitting means for directing the returned light in a direction that is different from a direction in which the light source is provided;
a photo detector that detects the returned light; and
a holding member in which the light source and the light splitting means are provided,
the photo detector being fixed to a location on the light splitting means from which location the returned light outgoes,
said adjusting method comprising the step of:
adjusting a location on the photo detector on which location the returned light is incident, by relatively moving the light source and the holding member while (i) the photo detector is being fixed to the light splitting means and (ii) the light splitting means is being fixed to the holding member.

19. The adjusting method according to claim 18, comprising the step of adjusting, in accordance with an output signal supplied by the photo detector, a location on the photo detector on which location the returned light is incident.

20. An adjusting method for an optical pickup, the optical pickup including:
a light source that emits light with respect to an optical storage medium;
light converging means for converging the light onto the optical storage medium;
a diffraction element that divides returned light returning from the optical storage medium;
light splitting means for directing the returned light in a direction that is different from a direction in which the light source is provided;
a photo detector that detects the returned light, the photo detector being provided at a position on a lower surface of the light splitting means from which position the returned light outgoes; and
a holding member in which the light source and the light splitting means are provided, the holding member having a depressed portion that allows the light source to be inserted therein,
the adjusting method comprising the steps of:
providing the light converging means;
adjusting a position of the light source in the depressed portion of the holding member; and
rotating the diffraction element so as to adjust focus offset with respect to an optical axis of the light emitted from the light source.

21. The adjusting method of claim 20, wherein the light converging means uses a collimator lens.

22. The adjusting method of claim 21, wherein the light source includes an adjusting member which is fixed to a package for accommodating a semiconductor laser chip.

23. An optical pickup, which is adjusted in accordance with the adjusting method of claim 21.

24. The adjusting method of claim 20, wherein the light source includes an adjusting member which is fixed to a package for accommodating a semiconductor laser chip.

25. An optical pickup, which is adjusted in accordance with the adjusting method of claim 20.

* * * * *